US010805440B1

(12) United States Patent
Pham

(10) Patent No.: US 10,805,440 B1
(45) Date of Patent: Oct. 13, 2020

(54) LIGHT-EMITTING-DIODE (#LED#) SYSTEM AND METHOD FOR ILLUMINATING A COVER FOR A PORTABLE ELECTRONIC DEVICE COMMENSURATE WITH SOUND OR VIBRATION EMITTED THEREFROM

(71) Applicant: Long Ngoc Pham, Statesboro, GA (US)

(72) Inventor: Long Ngoc Pham, Statesboro, GA (US)

(*) Notice: Subject to any disclaimer, the term of this patent is extended or adjusted under 35 U.S.C. 154(b) by 0 days.

(21) Appl. No.: 16/538,669

(22) Filed: Aug. 12, 2019

(51) Int. Cl.
H04M 1/00 (2006.01)
H04M 1/22 (2006.01)
G02F 1/13357 (2006.01)
H04M 1/02 (2006.01)

(52) U.S. Cl.
CPC ........ *H04M 1/22* (2013.01); *G02F 1/133603* (2013.01); *H04M 1/026* (2013.01); *H04M 1/0283* (2013.01)

(58) Field of Classification Search
CPC .... H04M 1/0283; H04M 1/18; H04M 1/0214; H04M 1/23; H04M 1/0247; H04M 1/0237; H04M 1/57; H04M 1/72519; H04B 1/3888
USPC .......................... 455/575.1, 575.8, 90.3, 567
See application file for complete search history.

(56) References Cited

U.S. PATENT DOCUMENTS

| 6,546,101 | B1 | 4/2003 | Murray et al. |
| 6,912,410 | B2 | 6/2005 | Auten et al. |
| 8,224,391 | B2 | 7/2012 | Kim et al. |
| 8,428,644 | B1 | 4/2013 | Harooni |
| 8,583,198 | B1 | 11/2013 | Coverstone et al. |
| 9,294,601 | B2 | 3/2016 | Hammond et al. |
| 9,563,264 | B1 | 2/2017 | Limp et al. |
| 9,584,174 | B1 | 2/2017 | Coverstone |

(Continued)

FOREIGN PATENT DOCUMENTS

| CN | 103907335 A | 2/2014 |
| GB | 2504560 A | 2/2014 |

(Continued)

OTHER PUBLICATIONS https://www.boog.li/.

(Continued)

*Primary Examiner* — Temica M Beamer
(74) *Attorney, Agent, or Firm* — John D. Tran; Rhema Law Group

(57) ABSTRACT

A cover system for covering a portable electronic device may include: a protective cover that covers the portable electronic device, the protective cover having: an assembly energized by an electrical signal, the assembly being removably coupled with the protective cover; and an electronic panel fixedly coupled with the assembly and the protective cover, the electronic panel having: a microphone that detects a sound and/or a vibration emitted by the portable electronic device to generate a communication signal indicative thereof; a plurality of light-emitting-diodes (LEDs) embedded in the electronic panel; a plug powering the plurality of LEDs; and an integrated circuit that generates the electrical signal to activate the plurality of LEDs in response to receipt of the communication signal from the microphone to cause the LEDs to produce a luminescence proportionate to and commensurate with an intensity and/or a rhythm of the sound and/or the vibration.

20 Claims, 6 Drawing Sheets

(56) References Cited

U.S. PATENT DOCUMENTS

| | | | |
|---|---|---|---|
| 9,593,842 | B2 | 3/2017 | Shoemake et al. |
| 9,635,736 | B2 | 4/2017 | Rice |
| 9,740,244 | B2 | 8/2017 | Rayeski |
| 2004/0137954 | A1 | 7/2004 | Engstrom et al. |
| 2011/0195753 | A1 | 8/2011 | Mock et al. |
| 2012/0052929 | A1 | 3/2012 | Thammasouk et al. |
| 2012/0302294 | A1* | 11/2012 | Hammond .............. H04M 1/18 455/567 |
| 2014/0159867 | A1* | 6/2014 | Sartee .................... G08B 5/36 340/6.1 |
| 2018/0332394 | A1* | 11/2018 | Seiler ..................... H04R 3/12 |

FOREIGN PATENT DOCUMENTS

| | | |
|---|---|---|
| RU | 2603536 C2 | 11/2016 |
| WO | 2002098006 A1 | 12/2002 |
| WO | 2011041727 A1 | 4/2011 |

OTHER PUBLICATIONS https://www.youtube.com/watch?v=AYIYufwif20.
https://www.cellphonecases.com/Apple-Iphone-6-Purple-Lilies-Purple-Confetti-Flashing-Led-Light-Quicksand-Glitter-Hybrid-Case-Cover.html.
https://na.redmagic.gg/pages/red-magic-3?gclid=EAIalQobChMlh9zEgpDY4gIVB9lkCh1WiQsFEAAYASAAEgIDp_D_BwE.
https://na.redmagic.gg/pages/red-magic-3?gclid=EAIalQobChMlh9zEgpDY4gIVB9IkCh1WiQsFEAAYASAAEgIDp_D_BwE.
https://lumee.com/collections/case.
https://www.aliexpress.com/item/Kisscase-For-iPhone-6-6s-Plus-Case-Called-Sense-LED-Flash-Light-Cover-For-iPhone-5/32825313304.html.
https://luxuriouscovers.com/by-mobile-tablet/apple/iphone-6-6s/vaku-r-apple-iphone-6-6s-leather-stitched-led-light-illuminated-apple-logo-3d-designer-case-back-cover.
https://www.amazon.com/WILLGOO-Music-Activated-Flashing-Expression-Protective/dp/B07JDG9Y2R.
https://www.samsung.com/us/mobile/mobile-accessories/phones/galaxy-s8-led-wallet-cover-blue-ef-ng950plegus/?cid=pla-ecomm-pfs-cha-22019-22505&gclid=CJnju4zD2OICFZDAZAodjIQGJw&gclsrc=aw.ds.
https://www.touchofmodern.com/sales/lunecase-77f25183-3a7d-454d-aa6b-3a3f349e953c/lune-case-icon.
https://www.macmerise.com/products/opco7pmmm4408.

* cited by examiner

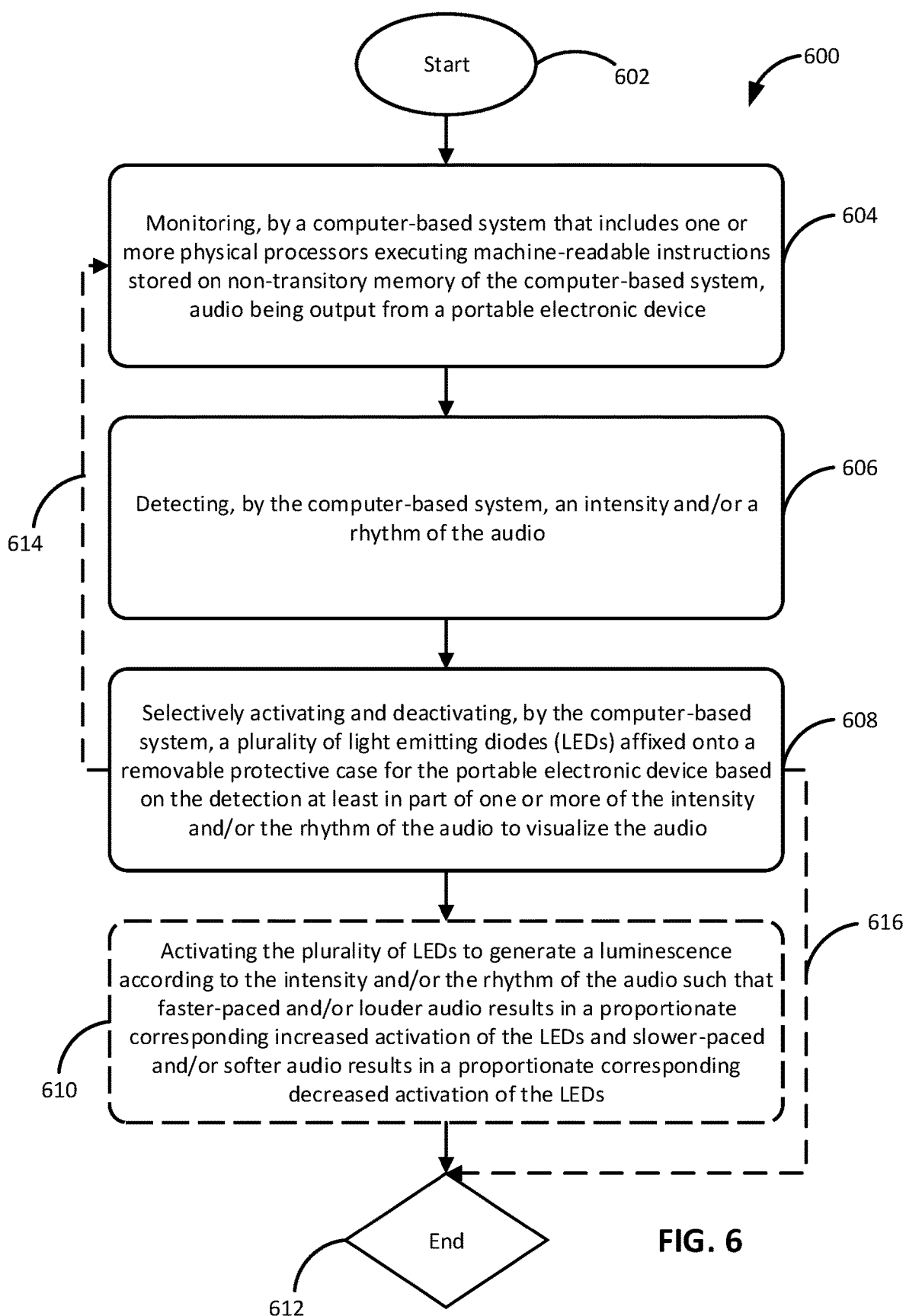

LIGHT-EMITTING-DIODE (#LED#) SYSTEM AND METHOD FOR ILLUMINATING A COVER FOR A PORTABLE ELECTRONIC DEVICE COMMENSURATE WITH SOUND OR VIBRATION EMITTED THEREFROM

TECHNICAL FIELD

The present disclosure relates to a LED system and method for illuminating a cover for a portable electronic peripheral such as a smartphone; and, more particularly, is concerned with using the LEDs to produce a luminescence proportionate to and commensurate with an intensity and/or a rhythm of a sound and/or a vibration emanated by the portable electronic device.

BACKGROUND

Portable electronic devices such as "smart" phones made by, for example, Samsung® or Apple®, have emerged as a ubiquitous and easily reconfigurable solution to an innumerable range of uses extending from text messaging and electronic commerce to real-time satellite-based navigation and music playing. Unsurprisingly, modem consumers have become increasingly reliant on such smart phones, requiring access thereto at all times and situations. Current smart phones have emerged as a panacea for nearly all daily life-related tasks and even provide an accessible safety solution for parents, caregivers and friends to monitor the whereabouts of children and other loved ones.

As a result of the above, smart phones may be prone to being misplaced, mishandled, and/or dropped on hard surfaces resulting in their breakage and malfunction. Aftermarket manufacturers have readily filled this market need by producing a multitude of protective cases for smart phones, ranging from, for example, those focused on a feminine aesthetic, e.g., featuring faux jewelry, to the most rugged industrial, e.g., construction, related applications. And, in view of shortcomings of battery life of many such smart phones in view of ongoing user needs for continued usage of demanding and resource-intensive applications run thereon, protective cases now also include extended battery capabilities, conveniently addressing multiple concerns associated with smart phone use simultaneously.

Regarding user notification indicative of an incoming call or text, smart phones each provide different output features, some ringing, others vibrating, while still others do both (e.g., ringing and vibrating at the same time). Typical protective smart phone cases may fail to include functionality related to communicating the presence of an incoming call or text, for example, although some may, thus allowing for the user to be notified of incoming communications even while the smart phone is placed face down on a surface.

Nevertheless, this dual-sided functionality has found limited development and application for other uses, e.g., primarily in the context of music playing. Current protective smart phone cases fail to provide music enthusiasts a means for readily visualizing music as it is played by the smart phone, the visualization being reflective of the intensity (e.g., volume) and/or rhythm of the music.

Solutions have been long sought but prior developments have not taught or suggested any complete solutions, and solutions to these problems have long eluded those skilled in the art. Thus, there remains a considerable need for devices and methods that may provide for the visualization of music as it is played, the visualization being commensurate to the intensity (e.g., volume) and/or rhythm of the music.

SUMMARY

A cover system for covering a portable electronic device with a computer processor integrated therein may include: a protective cover that at least partially covers the portable electronic device when the portable electronic device is inserted in the protective cover, the protective cover comprising: an assembly energized by an electrical signal, the assembly being removably coupled with the protective cover; and an electronic panel fixedly coupled with the assembly and the protective cover, the electronic panel having: a microphone that detects a sound and/or a vibration emitted by the portable electronic device; a plurality of light-emitting-diodes (LEDs) embedded in the electronic panel; a plug powering the plurality of LEDs, the plug electrically connecting to a port of the portable electronic device to power the LEDs thereby; and an integrated circuit that generates an electrical signal to activate the plurality of LEDs in response to detection of sound by the microphone to cause the LEDs to produce a luminescence proportionate to and commensurate with an intensity and/or a rhythm of the sound and/or the vibration.

In an embodiment, the assembly has multiple layers including: a glass layer; an intermediate layer having a pattern cut out therefrom; and a luminous layer that luminesces in response to being energized by the electrical signal, luminescence being emitted through the pattern cut out from the intermediate layer and through the glass layer to be visible.

The glass layer, the intermediate layer, and the luminous layer may assemble together to form an interchangeable substrate.

The cover system may include: an adhesive layer that affixes onto the electronic panel, the adhesive layer removably adhering to the interchangeable substrate.

In an embodiment, the sound and/or vibration is associated with any one or more of a group consisting of: a ringtone indicative of an incoming call to the portable electronic device and music or sounds played by the portable electronic device.

In an embodiment, the integrated circuit generates the electrical signal to activate the plurality of LEDs to generate the luminescence according to the intensity and/or the rhythm of the sound and/or the vibration detected by the microphone as being emitted by the portable electronic device such that faster-paced and/or louder music and/or sounds played by the portable electronic device results in a proportionate corresponding increased activation of the plurality of LEDs and slower-paced and/or softer music and/or sounds played by the portable electronic device results in a proportionate corresponding decreased activation of the plurality of LEDs.

In an embodiment, the pattern cut out from the intermediate layer corresponds to an indicium preferred by a user of the cover system.

In an embodiment, upon an activation of the plurality of LEDs, the red LED, the green LED, and the blue LED emit light for combination in various proportions to obtain any color in a visible spectrum.

An electronic panel for generating illumination responsive to detection of a sound emitted by a portable electronic device may include: a microphone sensitive to the sound emitted by the portable electronic device, the microphone being in electronic communication with an integrated circuit in the electronic panel such that the integrated circuit generates an electric signal representative of an intensity and/or a rhythm of the sound upon detection thereof by the microphone; a plurality of light-emitting-diodes (LEDs) embedded in the electronic panel, the plurality of LEDs illuminating in response to the electric signal generated by the integrated circuit; and a plug powering the LEDs, the plug electrically connecting to a port of the portable electronic device to power the electronic panel thereby.

A method for generating illumination by LEDs responsive to detection of sound, the method being implemented by a computer-based system that includes one or more physical processors executing machine-readable instructions stored on non-transitory memory of the computer-based system which, when executed, perform the method, the method may include the steps of: monitoring, by the computer-based system, audio being output from a portable electronic device; detecting, by the computer-based system, an intensity and/or a rhythm of the audio; selectively activating and deactivating, by the computer-based system, a plurality of light emitting diodes (LEDs) affixed onto a removable protective case for the portable electronic device based on the detection at least in part on one or more of the intensity and/or the rhythm of the audio to visualize the audio.

In an embodiment, the method may further include activating the plurality of LEDs to generate a luminescence according to the intensity and/or the rhythm of the audio such that faster-paced and/or louder audio results in a proportionate corresponding increased activation of the LEDs and slower-paced and/or softer audio results in a proportionate corresponding decreased activation of the LEDs.

Other contemplated embodiments may include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE FIGURES

The LED system and method for illuminating a cover for a portable electronic peripheral such as a smartphone to produce a luminescence proportionate to and commensurate with an intensity and/or a rhythm of a sound and/or a vibration emanated by the portable electronic device is illustrated in the figures of the accompanying drawings which are meant to be exemplary and not limiting, in which like reference numerals are intended to refer to like components, and in which:

FIG. 6 is a flow chart for an example method for operation of the LED system of FIGS. 1-5.

Figure 1:
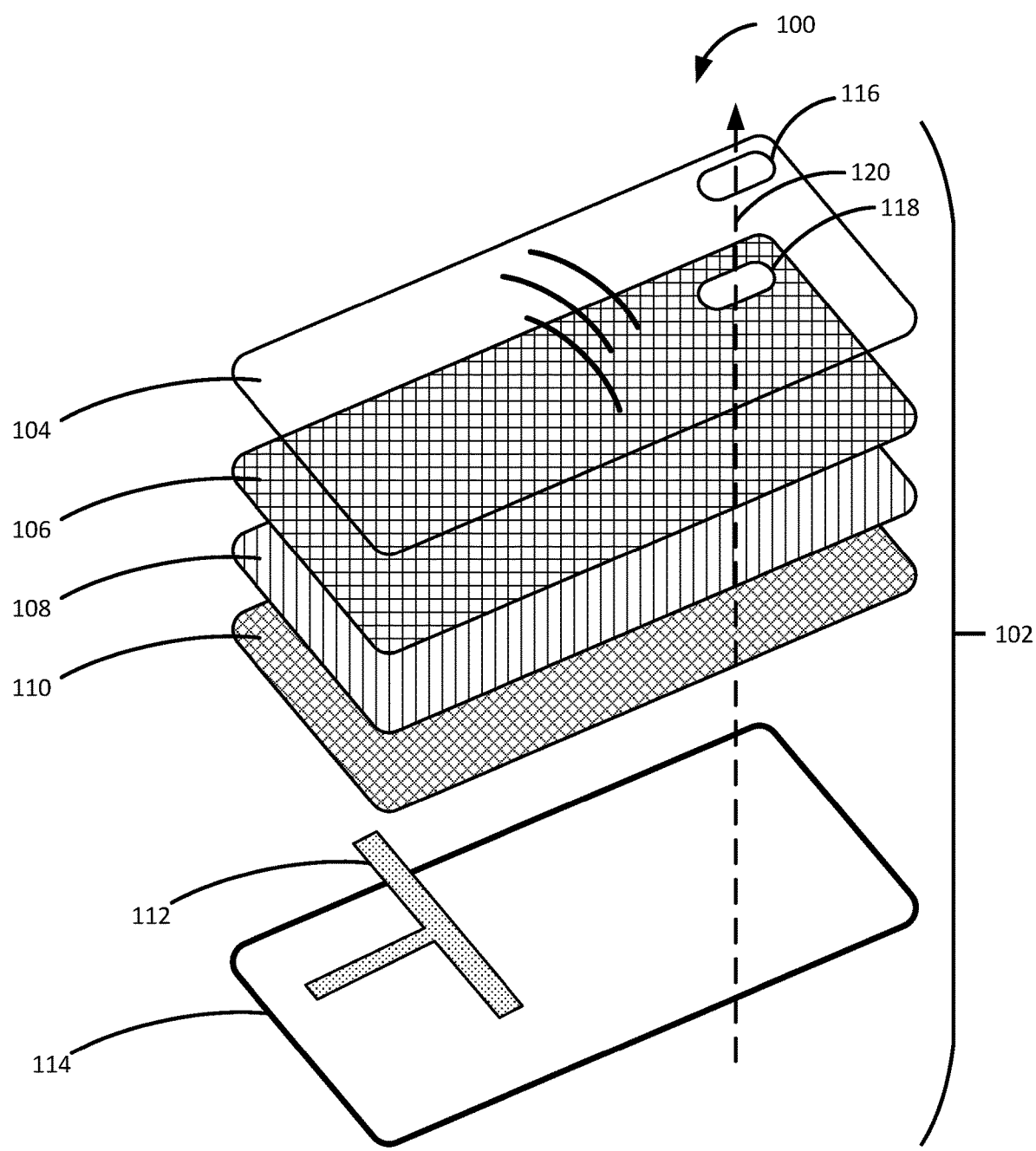
FIG. 1 is a schematic exploded view of LED system for illuminating a cover for a portable electronic peripheral in accordance with an embodiment.

Unless otherwise indicated illustrations in the figures are not necessarily drawn to scale.

DETAILED DESCRIPTION

General Techniques

In the following description, reference is made to the accompanying drawings that form a part hereof, and in which are shown by way of illustration, embodiments in which the light-emitting diode ("LED") system and method for illuminating a cover for a portable electronic device, the illumination being proportionate to and commensurate with an intensity and/or a rhythm of a sound and/or a vibration emanated by the portable electronic device, may be practiced. It is to be understood that other embodiments may be utilized and structural changes may be made without departing from the scope of the LED system.

When features, aspects, or embodiments of the LED system are described in terms of steps of a process, an operation, a control flow, or a flow chart, it is to be understood that the steps may be combined, performed in a different order, deleted, or include additional steps without departing from the integrated exercise mat system as described herein.

For simplicity and clarity of illustration, the drawing figures illustrate the general manner of construction of the LED system, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The disclosed embodiments are discussed below with reference to the Figures. However, those skilled in the art will readily appreciate that the detailed description given herein with respect to these figures is for explanatory purposes as the disclosed embodiments extend beyond the described embodiments. For example, it should be appreciated that those skilled in the art will, in light of the teachings of the present disclosed embodiments, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The LED system is described in sufficient detail to enable those skilled in the art to make and use the same and provides numerous specific details to give a thorough understanding of thereof; however, it will be apparent that the LED system may be practiced without these specific details.

To avoid obscuring the LED system, certain well-known configurations may not be disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the LED system may be operated in any orientation, placement and/or configuration.

Various aspects of the present disclosure are directed to a LED system for covering a portable electronic device with a computer processor integrated therein. More specifically, and as described in greater detail below, various aspects of the present disclosure are directed to a protective cover that at least partially covers the portable electronic device when the portable electronic device is inserted in the protective cover. The protective cover may have: an assembly energized by an electrical signal. The assembly may be removably coupled with the protective cover. An electronic panel may be fixedly coupled with the assembly and the protective cover. The electronic panel may have: a microphone that detects a sound and/or a vibration emitted by the portable electronic device. A plurality of light-emitting-diodes (LEDs) may be embedded in the electronic panel. A plug may power the plurality of LEDs, the plug electrically connecting to a port of the portable electronic device to power the LEDs thereby. An integrated circuit that may generate an electrical signal to activate the plurality of LEDs in response to detection of sound by the microphone to cause the LEDs to produce a luminescence proportionate to and commensurate with an intensity and/or a rhythm of the sound and/or the vibration.

Introduction

Portable electronic devices and/or peripherals having telephonic and other computing capabilities (referred to herein collectively as "smartphones") became available to consumers as recently an the late 1990s, but have since gained mainstream popularity with the introduction of apple's iPhone® in 2007. [Source: https://www.statista.com/topics/840/smartphones/; Retrieved on: 06-06-19]. The iPhone® revolutionized the smartphone industry by offering user-interface friendly features, such as a touch-screen interface and a virtual keyboard. Later, the first smartphone running on android was introduced to the consumer market in 2008.

The smartphone industry has been steadily growing since then, in terms of market size, available models, and suppliers. For instance, "[s]martphone shipments worldwide are projected to add up to around 1.7 billion units in 2020. By 2021, 40 percent of the world's population is projected to own a smartphone." [Source: https://www.statista.com/topics/840/smartphones/; Retrieved on: 06-06-19].

Of the many uses of smartphones, playing sounds, vibrations and/or music has emerged as a dominant usage type, with "new data which shows that 68% of US-based smartphone owners listen to music via streaming outlets on a daily basis, a stunning stat that further reaffirms the mobility of music fans today." [Source: https://www.digitalmusicnews.com/2016/03/11/parks-associates-68-of-u-s-smartphone-owners-listen-to-streaming-music-daily/; Retrieved on: 06-06-19]. "Within this group, . . . users [listen] to streaming music approximately 45 minutes per day, on average. The finding underscored the strong preference for mobile-based streaming consumption, with two-thirds of US smartphone users listening to music via a streaming service of some sort." [Source: https://www.digitalmusicnews.com/2016/03/11/parks-associates-68-of-u-s-smartphone-owners-listen-to-streaming-music-daily/; Retrieved on: 06-06-19].

Such a high demand for mobile streaming music combined with the rapid proliferation of smartphone consumption over the years has resulted in a scenario where consumers now seek to supplement smartphone capabilities related to music. And, practical necessities related to protection of the smartphones themselves remain, many such smartphones being prone to breakage upon being dropped or mishandled due to construction with delicate materials, e.g., glass surfaces, intricate semiconductor components susceptible to deterioration upon exposure to extreme temperature variance, etc. Thus, innovative efforts have been undertaken to effectively combine addressing these two needs, e.g.: (1) support of music playing via the smartphone; and, (2) protection of the smartphone itself. The following issued patents, patent application publications, incorporated herein by reference in their respective entireties, and publicly-available literature present and discuss sound (e.g., music), lighting (e.g., fluorescence, illumination, luminescence, etc.) and/or other entertainment-related smartphone protective cover and case solutions.

U.S. Patent Application Publication No.: 2014/0159867 entitled "Integrated visual notification system in an accessory device" describes embodiments that relate generally to an accessory for a tablet. The accessory takes the form of a flexible screen protector that maybe disposed over a display portion of the tablet. Because the flexible screen protector covers the display of the tablet there is no visual way for the tablet to provide notifications to the user while the screen protector overlays it. By providing a data and power connection between the tablet and the accessory, the processor of the tablet may command illumination elements disposed in the accessory to be illuminated in any of a number of illumination states. Each of the illumination states may be associated with an operating state of the tablet thereby allowing the tablet to visually communicate operating state information while the display is covered Moreover, segments may have a number of LEDs arranged across them. The LEDs are arranged in a regular array configuration, but it should be noted that any geometric configuration of the LEDs is possible. Each LED maybe either a single-color LED or may be configured as an RGB LED, the RGB LEDs allowing almost any color to be displayed by each of the LEDs. By illuminating select LEDs messages maybe displayed across an outer surface of accessory, the messages in some embodiments telling a user the exact nature of the alert or status update. As a density of LEDs increases so does the ability of accessory to provide higher resolution information to a user of the tablet while the tablet display is covered.

U.S. Patent Application Publication No.: 2014/0204511 entitled "Cover, an electronic device using the same and operating method thereof" describes a method for operating an electronic device including an electronic cover. The method includes coupling the electronic cover to the electronic device, determining a type of the electronic cover, and setting an interface based on the type of the electronic cover device.

U.S. Patent Application Publication No.: 2012/0052929 entitled "Interactive phone case" discloses an interactive device that has a plastic case for a mobile phone with graphics printed on the reverse side of a clear plastic film using non-conductive color inks. Electronic capacitive touch sensors are patterned and printed with conductive inks on a second plastic film in positions corresponding to individual graphic objects. A light guide layer is placed immediately beneath or above the pattern of printed electronic capacitive touch sensors. Diffusers on the top surface of the light guide layer catch light propagating and reflecting inside by refraction redirect it up to the user's eyes through openings in the non-conductive color ink graphics. The phone itself, a micro-controller, software, and associated electronic components mounted on a circuit board are used to control the lights sent into the light guide layer from its edges, and they control the response to touches being sensed by the touch sensors.

U.S. Patent Application Publication No.: 2011/0195753 entitled "Smartphone Case with LEDS" describes a smartphone case with LEDs. The case includes a front portion adapted to cradle a lower portion of a smartphone, a rear portion adapted to engagingly mate with the front portion to secure the smartphone within the case, a first strip of LEDS and a second strip of LEDS are mounted on opposing sides of the front portion, a vibrating sensor is adapted to activate the LEDS of the case when a vibrator of the smartphone is vibrating, and circuitry is used to control the vibrating sensor and the LEDS. The vibrating sensor detects vibrations of the vibrator of the smartphone when the smartphone is receiving an incoming call or message. The LEDS are programmed to display in a set sequence when activated, where the set sequence to display the LEDS is selected by a user.

U.S. Patent Application Publication No.: 2004/0137954 entitled "Visualization supplemented wireless mobile telephony-audio" describes a wireless mobile phone is provided with the capability to visually convey audio to users, using a number of light sources, such as light emitting diodes (LEDs), in accordance with one or more attributes of the audio. The attributes may include different volume, spectrum, treble, bass, and so forth. The visualization may animate dance steps. In various embodiments, a visualization controller may selectively activate and deactivate the LEDs. The LEDs may be disposed on a side surface or underneath an array of input keys. In various embodiments, all or selected combinations of the elements may be part of the base unit of the wireless mobile phone, while the remaining elements, if any, may be part of an interchangeable cover. The cover may be a housing cover or an accessory cover. (36 Total Claims).

U.S. Pat. No. 9,740,244 entitled "Color changing cover) discloses a cover system for an electronic device that may include a cover and a set of non-transitory computer instructions. The cover at least partially covers the installed electronic device. The cover may include a power storage device, an outer surface including a color changing region that includes a phosphor layer that luminesces when energized by an electrical signal, and an electrode for conducting the electrical signal to the phosphor layer. The cover may also include communication circuitry configured to receive a data communication from the installed portable electronic device and electrical circuitry configured to generate the electrical signal in response to receiving the data communication. The set of non-transitory computer instructions may direct a computer processor of the electronic device to establish a communication session with the communication circuitry of the cover to transmit the data communication to the cover.

U.S. Pat. No. 6,912,410 entitled "Communication devices and power packs that include a light source" describes communication devices, portable power devices, and power sources for these devices which include a source of illumination. The source of illumination is positioned and of sufficient candlepower to permit a person holding the device to illuminate his/her surroundings.

U.S. Pat. No. 6,546,101 entitled "Communication device having illuminated audio indicator" claims an illumination device for illuminating the speaker grill when audio is present at the ear piece.

U.S. Pat. No. 8,224,391 entitled "Mobile terminal having an LED backlight unit" describes a mobile terminal having a display unit provided with an LED backlight and controlling method thereof. The present invention includes a housing, a display unit including a liquid crystal display provided to one side of the housing and a backlight unit including a plurality of light emitting diodes for a backlight provided to a backside of the liquid crystal display and a control unit controlling the backlight unit to selectively adjust brightness of the light emitting diodes in part. Accordingly, a mobile terminal according to at least one of embodiments of the present invention controls light emission of an LED backlight locally, thereby providing more various display visual effects. And, a mobile terminal according to one embodiment of the present invention is able to use at least one portion of the light emitted from an LED BLU of a display unit as an illumination of a main body without using a separate light source for external illumination. Moreover, the illumination of the main body is able to play a role as a transmitter in a visible light communication.

G.B. Patent No.: 2,504,560 entitled "A case for a portable electronic device comprising a light diffuser and wherein an image contained in the case is illuminated by a light source" describes a case for a portable electronic device (especially for an iPhone® and the like) comprises a shell, a diffuser mounted within the shell, and an optional transparent insert with custom graphics located between a front side of the shell and the diffuser. The custom graphics contained in the case may be illuminated by means of a light source (e.g. camera flash) external to the case. Aspects of the invention include the diffuser comprising a Perspex panel having an etched portion from which light escapes. The diffuser may be slid between a position in which a flash of the device is unobstructed, for normal photographic use, and a position in which light from the flash is received on a first surface of the diffuser, whereby it is re-directed internally before being emitted from the etched portion on the opposite, second surface to provide even and bright illumination of that second surface. Alternative aspects of the invention include the light source incorporated into the case, (rather than using the camera flash) where micro LEDs are disposed below the diffuser and powered by a power source integrated in to the case.

W.O. Patent No.: 2002/098006 entitled "Illuminated decorative covers and telephones having such covers" discloses an illuminated decorative cover for a device, and a cellular telephone having such a cover. The illuminated decorative cover includes a cover member having an inner surface and an outer surface, an optical fiber member having an input end and having a side surface adapted to transmit light and a light source adjacent the input end of the optical fiber member to emit from the light source to the optical fiber member for transmission from the side surface of the optical fiber member. The optical fiber member is incorporated with the cover member in a pattern, causing light from the optical fiber member to be visible through the outer surface of the cover member in the pattern when the light source is emitting light.

W.O. Patent No.: 2002/098006 entitled "Protective cases with integrated electronics" discloses a protective case for a wireless electronics device includes one or more output devices integrated with or bonded to the protective case, from which a perceivable output (e.g., visible or audible indication) is generated. Various other electronics (e.g., circuit elements, ICs, microcontrollers, sensors) also may be integrated with or bonded to the protective case to provide power and/or one or more output signals to control the output device(s). In one example, a wireless signal generated by the wireless device is sensed by the integrated electronics, and the output device(s) are controlled based on the detected wireless signal. The protective case may be substantially rigid or at least partially deformable (flexible and/or stretchable), and the integrated electronics similarly may be at least partially deformable such that they may conform with various contours of the protective case and remain operative notwithstanding flexing and/or stretching of the case.

RU Patent No.: 2,603,536 entitled "Cases for portable electronic devices" claims a cover for a portable electronic device, comprising: a shell defining an inner volume, to snugly accommodate and cover all the specific portable electronic device. The sheath is interposed between each surface of the electronic device and the external space. A portion of the shell is translucent or transparent. An electroluminescent panel is visible through said translucent or transparent portion of the sheath. A connector is connected via an electrical connection to an electroluminescent (EL) panel and arranged to engage the mating connector on the portable electronic device when it is inserted into the interior volume to form an electrical connection between the power source in a portable electronic device and the EL panel, and a pocket that is interposed between the EL panel and the transparent or translucent part of the enclosure for receiving the transparent graphical elements.

CN Patent No.: 103,907,335 entitled "Illuminated cell phone case" claims a light emitting phone case, having: a cushion body sides, which surrounds a periphery of a mobile phone. The mobile phone is integrally buffered for protection of edges thereof from damage. A front flange is integrally disposed in front of the edge of the buffer, the surrounding peripheral front flange of the handset, and provides additional protection in front of the periphery of the mobile phone. A light-emitting label is disposed at the back of the light emitting handset housing. A rectangular planar LED, PCB and mobile phone components, having a front surface, a back surface and side edges, the planar rectangular LED, the PCB assembly has a plurality of a mobile phone and an LED lamp, one or more programmable microprocessors, which control the plurality of LED lights, a start switch, having a "ON" position, a "OFF" position and an "AUTO" position, and a battery that supplies power to the light emitting handset housing.

U.S. Pat. No. 9,593,842 entitled "Illumination device" describes an illumination device that has at least one light source and an attachment assembly that connects the light source to a computing device. The light source may be one or more LEDs or a light panel using electroluminescent lighting. The illumination device includes a power source coupled to the light source and a light control mechanism to change at least one of an operative state or an intensity of the light source. The illumination device may also be integrally connected to the computing device. A light cover is implemented to cover the light source and diffuse light emanating therefrom.

U.S. Pat. No. 9,294,601 entitled "Illuminated cell phone case" describes an illuminated cell phone case that includes a one-piece bumper that surrounds a perimeter of a cell phone, illuminated indicia that is disposed on a back portion of the illuminating cell phone case and a LED, PCB and battery assembly. The illuminating cell phone case includes one or more programmable microprocessors that controls a plurality of LED lights, LCD Screens, LED Screens, a motion sensing chip, an audio detection sensor microphone, electronic microprocessor switches that activates electronic components powered by a battery that provides power to the illuminating cellphone case.

U.S. Pat. No. 9,635,736 entitled "System and method for providing device accessory illumination based on device-related information" disclosure herein relates to a method and system for providing device accessory illumination (e.g., glowing, lighting-up, and/or other illumination) based on device-related information. Illumination may be provided at a device case (of a device) that interfaces with a charging device based on a charge status of the device, communication information of the device, and/or application information of the device. An illumination status for the device case may be determined based on the charge status of the device, the communication information, and/or the application information. Illumination may then be provided at the device case based on the illumination status. The illumination status may, for instance, indicate an amount, a color, a pattern, a time feature, a location, and/or other characteristic.

U.S. Pat. No. 9,563,264 entitled "Cover with device condition indication" describes a cover that may be used with a handheld device for physical protection of the handheld device. The cover may have an indicator that is responsive to a signal provided by the handheld device to display different colors or other visual states depending on conditions of the handheld device such as security modes, user modes, and so forth.

U.S. Pat. No. 8,583,198 entitled "Active cover for electronic device" discloses systems and methods of providing a mobile phone cover. The mobile phone cover may include a processor and lighting devices. The lighting devices may be operatively coupled to the processor, which may be configured to receive first signals based on second signals in which the second signals are generated by the mobile phone. The second signals may be indicative of an incoming call, an incoming message, a pending message, and/or a calendar alert (e.g., an upcoming appointment), for example. The processor may be configured to cause lighting of one or more of the lighting devices based on the first signals Some embodiments according to the present disclosure contemplate that the LEDs 160 or subsets of the LEDs 160 correspond to different frequencies (e.g., different LEDs 160 correspond to different musical notes such as A, B, C sharp, D flat, etc.) and that the ring tone indicative of a particular caller or a particular type of message is played out by the different LEDs 160. The circuitry could also control particular LED intensities and duration, for example, to correspond to different types of musical notes (e.g., quarter note, eighth note, etc.) and different musical dynamics (e.g., loud, soft). In some embodiments, the one or more sent signals represent one or more musical notes. The memory 210 may include, for example, a table or other memory arrangement that stores a correspondence between the one or more musical notes and the respective sequence, patterns, colors, and/or intensities of one or more selected LEDs 160.

U.S. Pat. No. 9,584,174 entitled "Active cover for electronic device" discloses systems and methods of providing a mobile device cover, which may include, for example, an acoustic sensor, a processor, and lighting devices. The processor may be operatively coupled to the acoustic sensor and the lighting devices. The acoustic sensor may be configured to receive sound generated by the mobile phone and to convert the sound into an acoustic signal. The processor may be configured to receive the acoustic signal and to determine whether the acoustic signal is similar to one of a plurality of acoustic signals previously stored on the mobile phone cover. Each of the previously stored acoustic signals may be indicative of, for example, a particular caller, a particular message sender, or a particular alert. Based on the acoustic signal determination, the processor is configured to cause lighting of the one or more lighting devices corresponding to the indicated caller, indicated message sender, or indicated alert.

U.S. Pat. No. 8,428,644 entitled "Integrated lighting accessory and case for a mobile phone device" describes a protective mobile phone device case that provides a LED lighting solution integrated with the case. The LED lighting solution may be used with the functions of the mobile phone device to provide illumination for photography and videography as well as to provide ornamental or decorative enhancements to the device.

In addition to the various issued U.S. Patents and U.S. Patent Application Publications presented and discussed above, various products, devices and/or solutions are currently available to consumers, for example (and without limitation):

The BOOGLI™ [Source: https://www.boog.li/; Retrieved on: 06-07-19] relates to novelty items and products resembling popular cartoon characters. The products are multi-functional, being able to hold or cradle a smartphone while simultaneously charging the same. During charging, the smartphone screen may be activated to mimic areas of the novelty item that is obscured or blocked by placement of the smartphone on the novelty item.

The Chinavision® 300 LED Programmable iPhone 6 case [Source: https://www.youtube.com/watch?v=AYlYufwif20; Retrieved on: 06-07-2019] features multiple LEDs placed on an exterior-facing surface of the case. The case is designed to removably and fixedly secure with a corresponding smartphone, e.g., an Apple® iPhone 6. The case features Bluetooth® 4.0 wireless connectivity to display messages, pictures, and more via intermittent activation and deactivation, e.g. "flashing", of the LEDs. Customizable settings allow for a user to use the touch-screen interface of the associated smartphone to define individual LEDs for activation resulting in complete usage flexibility. Additionally, the user may enter in text, in various languages, for scrolling display by selective activation and deactivation of individual LEDs.

The apple iPhone 6—Purple Lilies/Purple Confetti Flashing LED Light Quicksand Glitter Hybrid [Source: https://www.cellphonecases.com/Apple-Iphone-6-Purple-Lilies-Purple-Confetti-Flashing-Led-Light-Quicksand-Glitter-Hybrid-Case-Cover.html; Retrieved on: 06-07-19] case cover features a battery-powered protective case with flashing LED lights that illuminate the case with various entertaining colors. Smooth iridescent floating glitter is fully encapsulated within a transparent or translucent exterior-facing compartment of the case. The case is constructed from a thermoplastic polyurethane ("TPU") fused with a tough polycarbonate ("PC") backplate. The case further features precise openings to protect the camera and ports from impact and drops.

The Selfie Light PowerStar battery Pack and pro Video lighting case for 4.7" iPhone 6 [Source: http://www.stellarlightingsystems.com/selfie-light-powerstar-battery-pack-and-pro-video-lighting-case-for-4-7-iphone-6/; Retrieved on: 06-07-19] is covered by U.S. Pat. No. 8,428,644, presented and discussed above.

The Nubia Red Magic 3 [Source: https://na.redmagic.gg/pages/red-magic-3?gclid=EAIaIQobChMIh9zEgpDY4gIVB9lkChlWiQsFEAAYASAAEgIDp_D_BwE; Retrieved on: 06-07-19] offers many capabilities most commonly associated with high-performance gaming desktop and laptop computers, but in a convenient portable smartphone package. In addition, the Nubia Red Magic 3 features a "signature, customizable RGB [LED] strip" allowing for the expression of "distinctive style with 16.8 million colors and multiple lighting effects." 3 [Source: https://na.redmagic.gg/pages/red-magic-3?gclid=EAIaIQobChMIh9zEgpDY4gIVB9lkChlWiQsFEAAYASAAEgIDp_D_BwE; Retrieved on: 06-07-19].

The LuMee® brand offers multiple light-up protective cases for smartphones, including various apple iPhone® variants. [Source: https://lumee.com/collections/case; Retrieved on: 06-07-19]. Cases offered by LuMee® include variants providing for front and back facing lighting for creating a variety of mobile photos and videos. Further, LED lights on LuMee® cases flash to the beat of any song played on the associate smartphone, for dance parties, concerts, videos or for entertainment and enjoyment otherwise.

The KISSCASE for Apple® iPhones [Source: https://www.aliexpress.com/item/KISSCASE-For-iPhone-6-6s-Plus-Case-Called-Sense-LED-Flash-Light-Cover-For-iPhone-5/32825313304.html; Retrieved on: 06-07-19] is a protective case fitted to specific Apple® iPhone models featuring a translucent cover with imagery of popular global cities, such as London, Paris, and New York. LEDs installed within the translucent cover flash upon the iPhone receiving an incoming call, text message, or potential other notification (e.g., email, etc.).

The VAKU® Apple® iPhone 6/6s Leather Stitched LED Light Illuminated apple Logo 3D Designer Case [Source: https://luxuriouscovers.com/by-mobile-tablet/apple/iphone-6-6s/vaku-r-apple-iphone-6-6s-leather-stitched-led-light-illuminated-apple-logo-3d-designer-case-back-cover; Retrieved on: 06-07-19] features an LED light illuminated Apple® logo that activates upon receipt of an incoming call, text message, or other notification. The LED light in the protective leather case is powered by the iPhone® battery and electrically connects with the lighting chip in the Apple® battery port. The LED light is activated upon touching the touch-screen of the iPhone or upon receipt of an incoming call or text message and turns off after ten seconds of iPhone inactivity.

The WILLGOO Music-Activated Flashing iPhone Case [Source: https://www.amazon.com/WILLGOO-Music-Activated-Flashing-Expression-Protective/dp/B07JDG9Y2R; Retrieved on: 06-07-19] features a unique translucent patterned background that illuminates via activation of LED lights upon receipt of an incoming call as well as proportionately to the beat or rhythm of music played by the iPhone, or ambient music from the surroundings (e.g., as from a dance club).

The Samsung Galaxy S8 LED Wallet Cover [Source: https://www.samsung.com/us/mobile/mobile-accessories/phones/galaxv-s8-led-wallet-cover--blue-ef-ng950plegus/?cid=pla-ecomm-pfs-cha-22019-22505&gclid=CJnju4zD2OICFZDAZAodjlQGJw&gclsrc=aw.ds; Retrieved on: 06-07-19] provides a variety of information through LED light on the face of the smartphone cover. Such information includes the time and alarms. Calls may also be answered for rejected by swiping the cover.

The LUNE CASE "//" ICON [Source: https://www.touchofmodern.com/sales/lunecase-77f25183-3a7d-454d-aa6b-3a3f349e953c/lune-case-icon; Retrieved on: 06-07-19] is a snap-on fitted Apple® iPhone case that lights up to notify the user upon the iPhone receiving texts, calls or other alerts.

The SPECTRE—Light Up Case for an iPhone [Source: https://www.kickstarter.com/projects/nolo/spectre-light-up-case-for-an-iphone: Retrieved on: 06-07-19] features a substantially rigid protective cover the illuminates lighting embedded within the cover upon receipt of an incoming communication to the iPhone, e.g., a call or text.

The Radiance Case, RGB LED smart case, [Source: https://www.youtube.com/watch?v=2U-Majd84-o Retrieved on: 07-07-19] uses a RGB lighting system that projects an illuminated image through a series of transparent panels. An internal circuit board connected to the LED lighting system allows the Radiance Case to communicate with the Radiance application. RGB refers to a system for representing the colors red, green, and blue. These three colors can be combined in various proportions to obtain any color in the visible spectrum. With an RGB LED it is possible produce red, green, and blue light, and by configuring the intensity of each LED, other colors as well. The Radiance application allows for full control and customization of the RGB lights inside of the case. This allows the user the ability to design and program their own custom light functions and light modes by individually adjusting the intensity of each RGB bulb. The app's light mode programmer allows the user to program the LED lights to flash, cycle through colors, or fade between colors.

The Spider Web Suit—Luminous LED Case for OnePlus 7 Pro [Source: https://www.macmerise.com/products/opco7pmmm4408 Retrieved on: 06-07-19] provides a substantially rigid protective case with an illuminating light provided on an exterior-facing surface of the case. The light actives upon the push of a corresponding power button at the bottom of the case and has four modes of emitting light.

The above-listed U.S. Patents, U.S. Patent Application Publications, and non-patent literature are provided as examples are not intended to be limiting in any way. Innovation in "smart" smartphone cases has addressed a number of needs ancillary to smartphone usage, such as providing for LED-based illumination commensurate with the beat or rhythm of music played by the smartphone. However, cycling between smart smartphone cases is currently required should a user desire to change the indicia featured on the exposed surface of the case, e.g., to potentially match the mood or recording artist of a concert. Accordingly, users must physically remove the smartphone from its corresponding smart case to replace that smart case with another feature the desired design. Such a process is cumbersome and time wasteful, unnecessarily sacrificing precious leisure time in the process. Accordingly, there is at least need for a convenient system allowing for on-the-fly replacement of lenses, assemblies, or portions of a single smart smartphone case, each assembly featuring distinctive patterns, markings, or indicia, allowing the user to continue enjoyment of the phone without unwanted disruption.

EMBODIMENTS

Definitions

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items, and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event may include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" may mean real time less a time delay for processing (e.g., determining) and/or transmitting data. The particular time delay may vary depending on the type and/or amount of the data, the processing speeds of the hardware, the transmission capability of the communication hardware, the transmission distance, etc. However, in many embodiments, the time delay maybe less than approximately one second, two seconds, five seconds, or ten seconds.

The present disclosure may be embodied in other specific forms without departing from its spirit or characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" may mean within plus or minus five percent of the stated value. In further embodiments, "approximately" may mean within plus or minus three percent of the stated value. In yet other embodiments, "approximately" may mean within plus or minus one percent of the stated value.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present disclosure are generally performed according to conventional methods well known in the art and as described in various general and more specific references that are cited and discussed throughout the present specification unless otherwise indicated.

The following terms and phrases, unless otherwise indicated, shall be understood to have the following meanings:

The term "smartphone" refers to a class of mobile phones and of multi-purpose mobile computing devices. They are distinguished from feature phones by their stronger hardware capabilities and extensive mobile operating systems, which facilitate wider software, internet (including web browsing [Source: "A Survey of Techniques for Improving Efficiency of Mobile Web Browsing", CPE, 2018] over mobile broadband), and multimedia functionality (including music, video, cameras, and gaming), alongside core phone functions such as voice calls and text messaging. Smartphones typically include various sensors that can be leveraged by their software, such as a magnetometer, proximity sensors, barometer, gyroscope and accelerometer, and support wireless communications protocols such as Bluetooth, Wi-Fi, and satellite navigation.

The term "display device" refers to an output device for presentation of information in visual [Source: Lemley, Linda. "Chapter 6: Output". Discovering Computers. University of West Florida. Archived from the original on 14 Jun. 2012. Retrieved 3 Jun. 2012] or tactile form.

The term "electronic visual display" refers to a display device for presentation of images, text, or video transmitted electronically, without producing a permanent record. Electronic visual displays include television sets, computer monitors, and digital signage. They are ubiquitous in mobile computing applications like tablet computers, smartphones, and information appliances.

The term "flat-panel display" refers to electronic viewing technologies used to enable people to see content (still images, moving images, text, or other visual material) in a range of entertainment, consumer electronics, personal computer, and mobile devices, and many types of medical, transportation and industrial equipment. They are far lighter and thinner than traditional cathode ray tube (CRT) television sets and video displays and are usually less than 10 centimeters (3.9 in) thick. Flat-panel displays can be divided into two display device categories: volatile and static. Volatile displays require that pixels be periodically electronically refreshed to retain their state (e.g., liquid-crystal displays (LCD)). A volatile display only shows an image when it has battery or AC mains power. Static flat-panel displays rely on materials whose color states are bi-stable (e.g., e-book reader tablets from Sony®), and as such, flat-panel displays retain the text or images on the screen even when the power is off. As of 2016, flat-panel displays have almost completely replaced old CRT displays. In many 2010-era applications, specifically small portable devices such as laptops, mobile phones, smartphones, digital cameras, camcorders, point-and-shoot cameras, and pocket video cameras, any display disadvantages of flat-panels (as compared with CRTs) are made up for by portability advantages (thinness and lightweight-ness).

The term "electroluminescent (EL) display" refers to a type of Flat panel display created by sandwiching a layer of electroluminescent material such as GaAs between two layers of conductors. When current flows, the layer of material emits radiation in the form of visible light. Electroluminescence (EL) is an optical and electrical phenomenon where a material emits light in response to an electric current passed through it, or to a strong electric field. EL works by exciting atoms by passing an electric current through them, causing them to emit photons. By varying the material being excited, the color of the light emitted can be changed. The actual ELD is constructed using flat, opaque electrode strips running parallel to each other, covered by a layer of electroluminescent material, followed by another layer of electrodes, running perpendicular to the bottom layer. This top layer must be transparent in order to let light escape. At each intersection, the material lights, creating a pixel.

The term "liquid crystal (LC) display" refers to a flat-panel display or other electronically modulated optical device that uses the light-modulating properties of liquid crystals. Liquid crystals do not emit light directly, instead using a backlight or reflector to produce images in color or monochrome. [Source: "Definition of LCD". www.merriam-webster.com: Retrieved on: 06-07-19] LCDs are available to display arbitrary images (as in a general-purpose computer display) or fixed images with low information content, which can be displayed or hidden, such as preset words, digits, and seven-segment displays, as in a digital clock. They use the same basic technology, except that arbitrary images are made up of a large number of small pixels, while other displays have larger elements. LCDs can either be normally on (positive) or off (negative), depending on the polarizer arrangement. For example, a character positive LCD with a backlight will have black lettering on a background that is the color of the backlight, and a character negative LCD will have a black background with the letters being of the same color as the backlight. Optical filters are added to white on blue LCDs to give them their characteristic appearance.

The term "light-emitting diode (LED)" refers to a semiconductor light source that emits light when current flows through it. Electrons in the semiconductor recombine with electron holes, releasing energy in the form of photons. This effect is called electroluminescence. [Source: "LED". Encyclopedia Britannica; Retrieved Jan. 12, 2019.] The color of the light (corresponding to the energy of the photons) is determined by the energy required for electrons to cross the band gap of the semiconductor. [Source: Edwards, Kimberly D. "Light Emitting Diodes" (PDF). University of California at Irvine. p. 2; Retrieved on 01-12-19.] White light is obtained by using multiple semiconductors or a layer of light-emitting phosphor on the semiconductor device.

[Source: Lighting Research Center. "How is white light made with LEDs?". Rensselaer Polytechnic Institute; Retrieved on 01-12-19].

The term "electroluminescence" refers to an optical phenomenon and electrical phenomenon in which a material emits light in response to the passage of an electric current or to a strong electric field. This is distinct from black body light emission resulting from heat (incandescence), a chemical reaction (chemiluminescence), sound (sonoluminescence), or other mechanical action (mechano-luminescence).

The term "light-emitting diode (LED) display" refers to a flat panel display that uses an array of light-emitting diodes as pixels for a video display. Their brightness allows them to be used outdoors where they are visible in the sun for store signs and billboards. In recent years, they have also become commonly used in destination signs on public transport vehicles, as well as variable-message signs on highways. LED displays are capable of providing general illumination in addition to visual display, as when used for stage lighting or other decorative (as opposed to informational) purposes.

The term "OLED" refers to a light-emitting diode (LED) in which the emissive electroluminescent layer is a film of organic compound that emits light in response to an electric current. This organic layer is situated between two electrodes; typically, at least one of these electrodes is transparent. OLEDs are used to create digital displays in devices such as television screens, computer monitors, portable systems such as smartphones, handheld game consoles and PDAs. A major area of research is the development of white OLED devices for use in solid-state lighting applications. [Source: Kamtekar, K. T.; Monkman, A. P.; Bryce, M. R. (2010); "Recent Advances in White Organic Light-Emitting Materials and Devices (WOLEDs)"; Advanced Materials. 22 (5): 572-582; D'Andrade, B. W.; Forrest, S. R. (2004). "White Organic Light-Emitting Devices for Solid-State Lighting". Advanced Materials. 16 (18): 1585-1595; Chang, Yi-Lu; Lu, Zheng-Hong (2013). "White Organic Light-Emitting Diodes for Solid-State Lighting". Journal of Display Technology. PP (99): 1.]

The term "AMOLED display" refers to a display device technology used in smartwatches, mobile devices, laptops, and televisions. OLED describes a specific type of thin-film-display technology in which organic compounds form the electroluminescent material, and active matrix refers to the technology behind the addressing of pixels.

The term "touchscreen" refers to an input device and normally layered on the top of an electronic visual display of an information processing system. A user can give input or control the information processing system through simple or multi-touch gestures by touching the screen with a special stylus or one or more fingers. [Source: Walker, Geoff (August 2012). "A review of technologies for sensing contact location on the surface of a display". Journal of the Society for Information Display. 20 (8): 413-440.] Some touchscreens use ordinary or specially coated gloves to work while others may only work using a special stylus or pen. The user can use the touchscreen to react to what is displayed and, if the software allows, to control how it is displayed; for example, zooming to increase the text size. The touchscreen enables the user to interact directly with what is displayed, rather than using a mouse, touchpad, or other such devices (other than a stylus, which is optional for most modern touchscreens). Touchscreens are common in devices such as game consoles, personal computers, electronic voting machines, and point-of-sale (POS) systems. They can also be attached to computers or, as terminals, to networks. They play a prominent role in the design of digital appliances such as personal digital assistants (PDAs) and some e-readers. Touchscreens are also important in educational settings such as classrooms or on college campuses. [Source: Allvin, Rhian Evans (09/01/2014). "Technology in the Early Childhood Classroom". Y C Young Children. 69 (4): 62]

The term "iOS" refers to a mobile operating system created and developed by Apple Inc. exclusively for its hardware. It is the operating system that presently powers many of the company's mobile devices, including the iPhone, iPad, and iPod Touch. The iOS user interface is based upon direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching between portrait and landscape mode). Apple has been significantly praised for incorporating thorough accessibility functions into iOS, enabling users with vision and hearing disabilities to properly use its products.

The term "android" refers to a mobile operating system developed by Google®. It is based on a modified version of the Linux kernel and other open source software, and is designed primarily for touchscreen mobile devices such as smartphones and tablets. In addition, Google® has developed Android TV for televisions, Android Auto for cars, and Wear OS for wrist watches, each with a specialized user interface. Variants of Android are also used on game consoles, digital cameras, PCs and other electronics.

The term "smart case", also known as a "smart cover", refers to a protective device for at least partially covering a portable electronic peripheral, the protective device having electronic and/or wireless telecommunications functionality for communicating with the underlying device intended for protection. Smart cases can have LEDs embedded or otherwise integrated therewith for displaying information to a user.

Generic Description of the Disclosed Embodiments

Smartphone usage has expanded greatly over time, with recent surveys indicating that "almost three quarters (72.6 percent) of internet users will access the web solely via their smartphones by [the year] 2025, equivalent to nearly 3.7 billion people." [Source: https://www.cnbc.com/2019/01/24/smartphones-72percent-of-people-will-use-only-mobile-for-internet-by-2025.html; Retrieved on: 07-08-19]. Also, the "time spent on smartphones is set to overtake the hours spent on accessing the internet from PCs." [Source: https://www.cnbc.com/2019/01/24/smartphones-72percent-of-people-will-use-only-mobile-for-internet-by-2025.html; Retrieved on: 07-08-19]. In tandem with such increases in higher numbers of people using smartphones, and accessing the Internet through their smartphones, are increases in how people listen to music. Abandoning traditional music listening methods and means, music enthusiasts are increasingly turning to the versatility provided by smartphones, "new data which shows that 68% of US-based smartphone owners listen to music via streaming outlets on a daily basis, a stunning stat that further reaffirms the mobility of music fans today. Within this group, . . . users listen to streaming music approximately 45 minutes per day, on average. The finding underscored the strong preference for mobile-based streaming consumption, with two-thirds of US smartphone users listening to music via a streaming service of some sort." [Source: https://www.digitalmusicnews.com/2016/03/11/parks-associates-68-of-u-s-smartphone-owners-listen-to-streaming-music-daily/; Retrieved on: 07-08-19].

Such strong and particularized demand (e.g., specific to usage of smartphones for streaming music) has resulted in considerable innovation in the area, many products and solutions being released directed to addressing the needs of providing entertainment means supplementary to music playing on smart phones and devices. Ancillary to such devices is the ongoing need for physical protection of smartphones, given their relatively fragile construction, and the interest of music enthusiast smartphone users to easily interchange themed indicia related to music being played on the smartphone, e.g., matching the mood, genre, pace, or type of played music.

Current solutions fail to comprehensively address such a multi-faceted need effectively, e.g., by failing to provide for a convenient means for users to interchange at least partially translucent portions of a protective smartphone cover or chase to match music played on the smartphone, while also further providing for illumination commensurate with the loudness and rhythm of the music. The disclosed embodiments are directed to providing at least such a solution, offering an assembly (e.g., facing an exterior and/or otherwise opposite to and away from an active touch-sensitive screen surface of the smartphone) comprised of multiple layers, each layer disposed on the other, the assembly adhering to an integrated circuit, circuit board, and/or chipset capable of illuminating multiple LEDs associated therewith for emanating light throughout the layers of the assembly.

Users benefit from, at least, convenience offered in easily removing and replacing the assembly with another, each exterior-facing assembly having a cut-out therein, the cut-out either being open (e.g., to exterior surroundings, in an embodiment, or filled with a transparent or translucent resin, glass, or other substance permitting for light emitted from the LEDs to shine there-through. The LEDs include each of a red LED, green LED, and blue LED and flash commensurate to the loudness and rhythm of the music played by the smartphone as detected by an acoustic sensor or audio detection sensor microphone electronically integrated with the chipset to provide a complete entertainment experience.

System Structure

Referring to FIG. 1, therein is shown an exploded perspective schematic view of a flashing LED system 100 feature multiple interconnected layers 102, inclusive of: a glass layer 104 (e.g., that may be at least partially made from a molded and/or tempered glass), an intermediate layer 106 with one or more patterns cut-out thereof or otherwise formed thereon, a luminous layer 108, an adhesive layer 110, a circuit board 112 (also referred to herein as an "integrated circuit" and/or a "chipset", and a soft edge peripheral cover 114. One skilled in the art will appreciate the layers 102 shown in FIG. 1 are provided as examples and that other suitable layers and/or configurations thereof may exist without departing from the scope and spirit of the disclosed embodiments. Regarding high-level operation of the flashing LED system 100, a smartphone or device (not shown in FIG. 1) may be inserted into the soft edge peripheral cover 114 to be substantially enclosed thereby. The soft edge peripheral cover 114 may provide impact protection of the smartphone against rigid surfaces, such as the ground (e.g., concrete), providing necessary cushioning against, for example (but without limitation), breakage or damage of smartphone components. In an embodiment, the soft edge peripheral cover 114 may be made from thermoplastic polyurethane (TPU) or any other suitable class of plastics allowing for the necessary flexibility to form-fit specific smartphones, e.g., Apple® iPhone and Android®-based devices.

Figure 4:
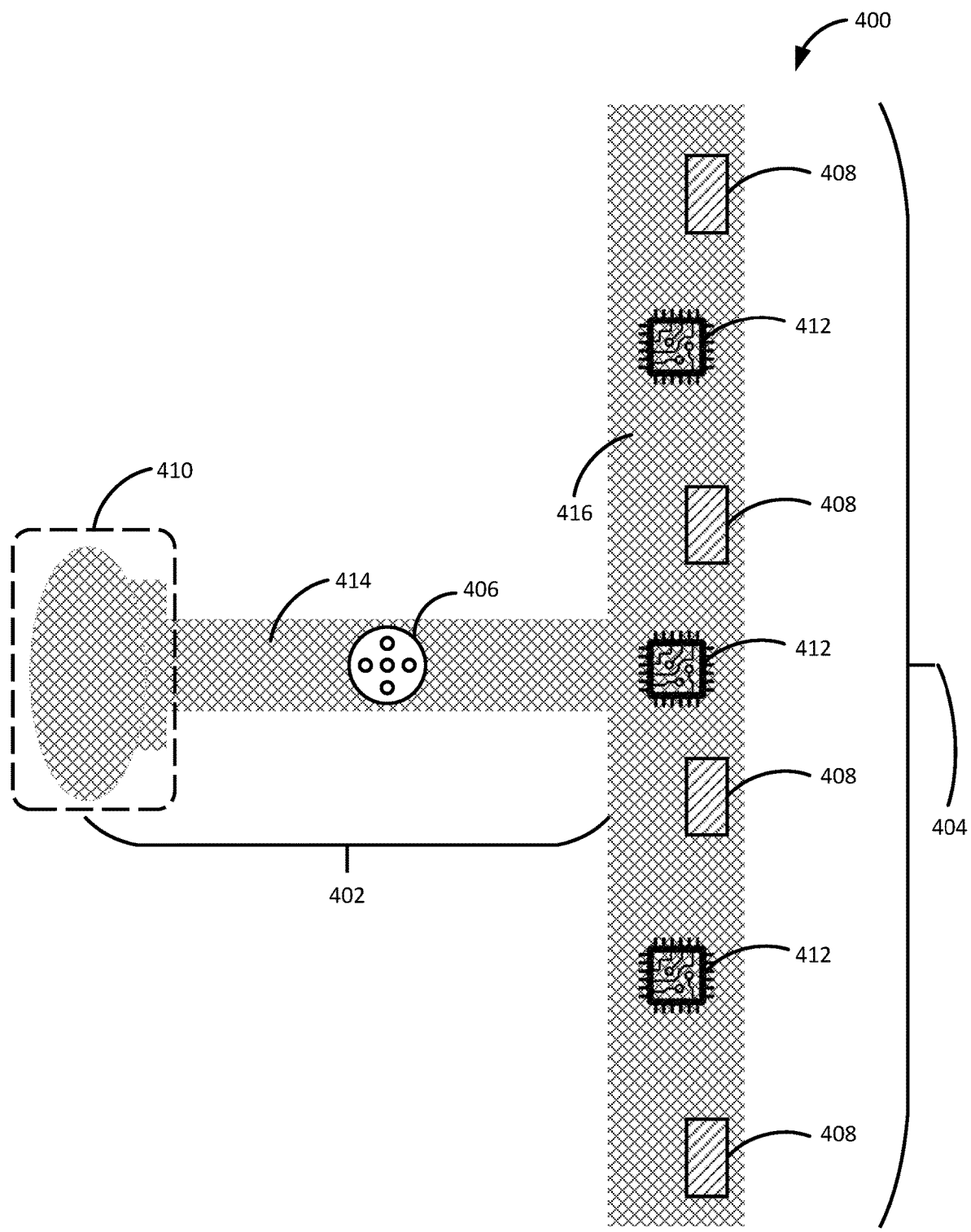
FIG. 4 is a schematic illustration of an example flashing panel unit (also referred to as an "assembly") having several LEDs installed therein for illuminating proportionate to sound detected from the portable electronic peripheral in accordance with an embodiment.

The circuit board 112, in an embodiment, removably affixes to or otherwise couples with edges of the of the soft edge peripheral cover 114 and features various componentry further described in detail in FIG. 4 associated with the automatic detection of sound emitted from the smartphone. Such detection of sound by the circuit board 112 results in the corresponding generation of an electrical signal to activate the plurality of LEDs to shine light through the adhesive layer 110, such light also disseminating and/or dispersing through the luminous layer 108, which may include a substance, such as a phosphor. Phosphors demonstrate the phenomenon of luminescence, e.g., commonly understood and defined herein as the spontaneous emission of light by a substance not resulting from heat; it is thus a form of cold-body radiation. Luminescence can be caused by chemical reactions, electrical energy, subatomic motions or stress on a crystal. This distinguishes luminescence from incandescence, which is light emitted by a substance as a result of heating.

Light emitted by the LEDs of the circuit board 112 further travels through the luminous layer 108, after at least partially illuminating the same as described above, to and through the intermediate layer 106 with one or more patterns cut-out therefrom or otherwise associated therewith. Such patterns may be coordinated to match or supplement the music being played by the smartphone, e.g., of a particular recording artist of the listener or user. For instance, such patterns may include indicia corresponding to band logos and the like. Also, in an embodiment, patterns may be cut-out of or otherwise associated with the luminous layer 108, thus allowing for the creation of unique tints and/or shades to further alter light shining there-through, e.g., the luminous layer being prepared in certain sections to have a pre-defined hue or tint that interacts with LED light the change the color of the light as is progressively shines into and through the luminous layer 108 and/or intermediate layer 106.

Lastly, the glass layer 104 may be formed from a tempered glass substrate, e.g., "tempered glass" being commonly understood and defined herein as a type of safety glass processed by controlled thermal or chemical treatments to increase its strength compared with normal glass. Tempering puts the outer surfaces into compression and the interior into tension. Such stresses cause the glass, when broken, to crumble into small granular chunks instead of splintering into jagged shards as plate glass (a.k.a. annealed glass) does. The granular chunks are less likely to cause injury. In an embodiment, the glass layer 104 may specifically correspond with and thus fill-in gaps created by the cut-outs formed in the intermediate layer 106, essentially forming a glassy "window" through which the LED-emitted light may shine. Alternatively, in an embodiment, the glass layer 104 may extend across the entirety of the exposed surface of the flashing LED system 100, e.g., as shown in FIG. 1.

Operationally, the flashing LED system 100 relies on the circuit board 112, and/or a microphone embedded therein, to detect sound emitted by the smartphone (not pictured in FIG. 1). The circuit board 112, in an embodiment, is electrically powered via a plug (not pictured in FIG. 1) connected to a data or charge port of the smartphone, e.g., such as through a micro-USB, USB type C, and/or Apple® Lightning port. The circuit board 112 upon being sufficiently electrically powered is ready and capable to detect sounds emitted by the smartphone or otherwise prevalent in the ambient environment of the smartphone. And, upon detection of such sounds, the circuit board 112 generates an electrical signal to systematically activate and/or deactivate one or more of the LEDs to shine light through one or more of the multiple interconnected layers 102, such shining or "flashing" being commensurate with the loudness, beat, and/or rhythm of the sound, e.g., music, played by the smartphone. In an embodiment, the shining of the LEDs may be commensurate with sounds and/or music being played in the general vicinity of the flashing LED system 100. Toggling of specific loudness, rhythm or other sound-quality or performance related thresholds, e.g., sensitivity to detection of sounds emitted by the smartphone itself specifically versus sounds prevalent in the surrounding area of the circuit board 112, may be input and further adjusted by a user through an application, e.g., commonly referred to as a smartphone application or "app", installed on the smartphone.

In an embodiment, any one or more of the multiple interconnected layers 102 may be positioned adjacent to one-another in a general "sandwiched" format as shown in FIG. 1. Further, the glass layer 104 and the intermediate layer 106 may be affixed to each other to form a singular replaceable assembly such that light emitted by the LEDs emanates through the adhesive layer 110 and luminous layer 108 only. Next, a different glass layer 104 and intermediate layer 106, e.g., featuring a pattern or indicia distinct and different from the previously installed glass and intermediate layers, 104, 106, may be fitted onto the adhesive layer 110 for adhesion or otherwise attachment therewith. In an embodiment, the intermediate layer 106 may be imprinted with ultraviolet-sensitive ink. Accordingly, users of the flashing LED system 100 may easily and conveniently replace and/or exchange glass and intermediate layers, 104, 106 to, for example (but without limitation), match specific types, genres, and/or themes of music as well as individual recording artist logos, etc., providing for a total entertainment solution for concert-going smartphone music enthusiasts and dance club attendees alike. Also, holes 116, 118 cut out of the glass and intermediate layers 104, 106, respectively, provide ambient light to reach a camera (not shown in FIG. 1) through, for example (but without limitation thereto), a line-of-sight 120, thus permitting for continued use thereof even with the flashing LED system 100 installed with or on a smartphone, e.g., thus not impeding the continued versatility thereof.

Figure 2:
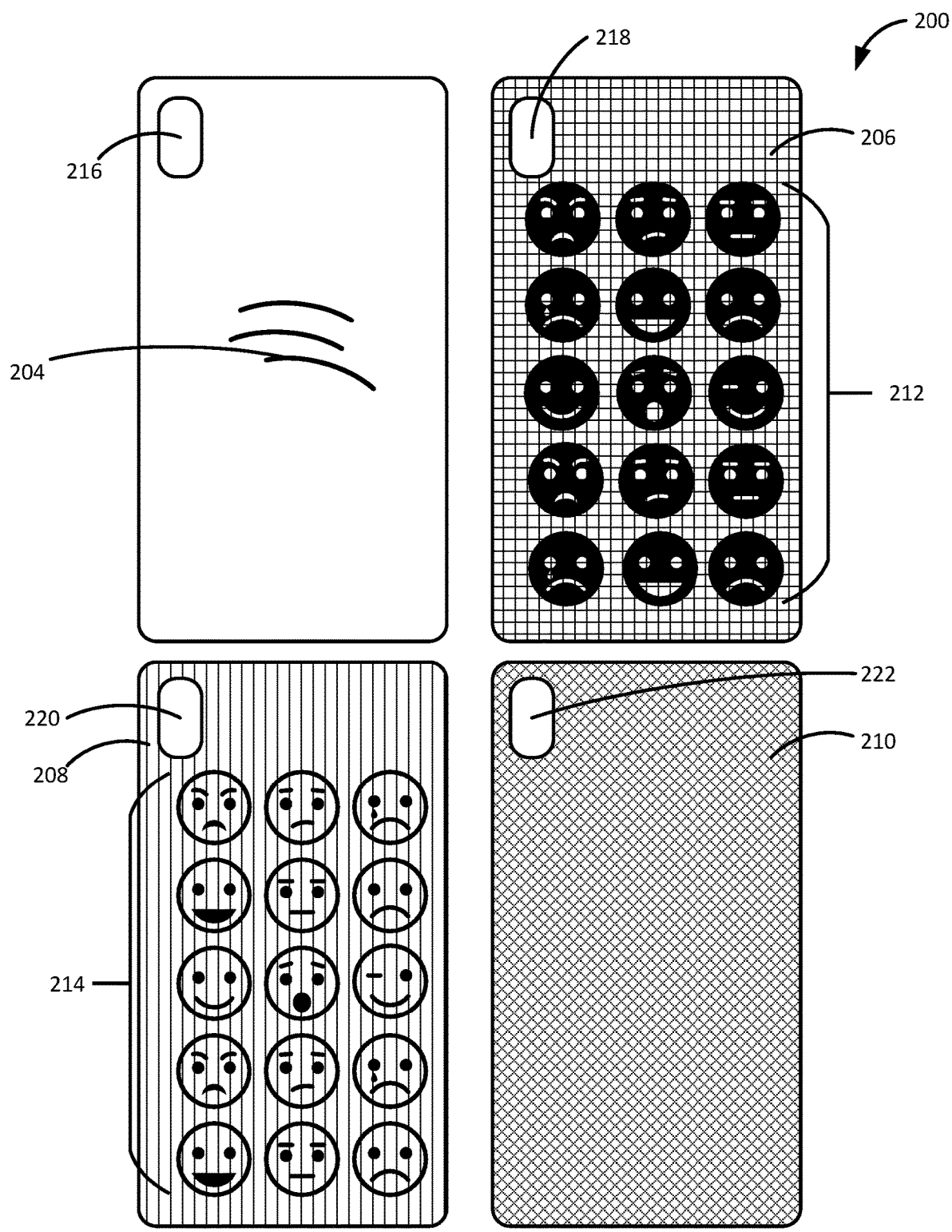
FIG. 2 shows several top-down views of various interchangeable layers of the LED system and indicia printed or otherwise formed thereon in accordance with an embodiment.

Referring to FIG. 2, several top-down views 200 of multiple interconnected layers 102 of the flashing LED system 100 and indicia printed or otherwise formed thereon are shown. Each of a glass layer 204, an intermediate layer 206, a luminous layer 208 and an adhesive layer 210 are shown in a top-down view or orientation. That shown by views 200 in FIG. 2 correspond with the multiple interconnected layers 102 such that a redundant description of the same is omitted. Holes 216-222 are formed in layers 204-210, respectively, at a location conducive for convenient access to or visibility of a camera (not shown in FIG. 2) of the smartphone.

The glass layer 204 may be wholly transparent, e.g., commonly understood and defined herein to refer to having the property of transmitting light without appreciable scattering so that objects lying beyond are clearly seen [Source: https://www.merriam-webster.com/dictionary/transparent; Retrieved on 06-08-19], and/or translucent, e.g., commonly understood and defined herein as permitting the passage of light or transmitting and diffusing light so that objects beyond cannot be seen clearly. And, as introduced earlier in FIG. 1, the glass layer 104 (shown in FIG. 1) and thus the glass layer 204 (shown in FIG. 2) may be shaped or formed to fit into open spaces or gaps formed by cut-outs 212 formed in an intermediate layer 206, or (in the alternative) extend across the entire exposed rear surface of the smartphone. Further, in an embodiment, the glass layer 204 may be clear, e.g., un-colored, allowing for unimpeded light emission or transmission as emitted by the LEDs of the circuit board 112. In an embodiment, the glass layer 204 may feature regions or areas that are colored to disrupt light emission or transmission as emitted by the LEDs of the circuit board 112 as desired to accommodate specific patterns, e.g., of the cut-out 212.

In an embodiment, the luminous layer 208 may be formed or otherwise include a phosphor or other luminescent material, such as (but without limitation to): electroluminescent devices fabricated using either organic or inorganic electroluminescent materials. The active materials are generally semiconductors of wide enough bandwidth to allow exit of the light. Example inorganic thin-film EL (TFEL) materials include ZnS:Mn with yellow-orange emission. Non-exhaustive examples of the range of EL material include: powdered zinc sulfide doped with copper (producing greenish light) or silver (producing bright blue light); thin-film zinc sulfide doped with manganese (producing orange-red color); naturally blue diamond, which includes a trace of boron that acts as a dopant; semiconductors containing Group III and Group V elements, such as indium phosphide (InP), gallium arsenide (GaAs), and gallium nitride (GaN) (Light-emitting diodes); and, certain organic semiconductors, such as [Ru (bpy)$_3$]$^{2+}$(PF$_6^-$)$_2$, where bpy is 2,2'-bipyridine. One skilled in the art will appreciate that this listing is provided as an example and is non-exhaustive as other suitable thin-film EL materials may exist. Further, other types of luminescent materials may be used other than thin-film EL materials, where such materials favorably interact with light emitted by LEDs associated with the circuit board 112, e.g., dispersing incoming light throughout the extent of the luminous layer 208. Also, in an embodiment, the luminous layer 208 may have indicia 214 printed or otherwise formed thereon to correspond with the cut-outs 212 formed in the intermediate layer 206, thus providing for further options regarding customization of lighting for the luminous and intermediate layers, 206, 208, respectively, for matching with user preferences according to, for example (and without limitation), music played by the smartphone.

The adhesive layer 210, in an embodiment, may be affixed on to an integrated circuit, e.g., similar to the circuit board 112 for the flashing LED system 100 shown in FIG. 1, having an outward facing adhesive surface suitable for removable adhesion or attachment with any one or more of the glass, intermediate, and luminous layers 204-214, respectively, to accommodate convenient replacement of glass, intermediate, and luminous layers 204-214 for specific user tastes intended to match, for example (and without limitation), a specific music type, song, genre or band logo. And, in an embodiment, similar to that shown by the flashing LED system 100 of FIG. 1, each of the layers 204, 206, 208, and 210, may have formed therein or otherwise cut-out thereof corresponding holes 216, 218, 220, and 222, respectively, to permit for light access to a camera of a smartphone.

Figure 3:
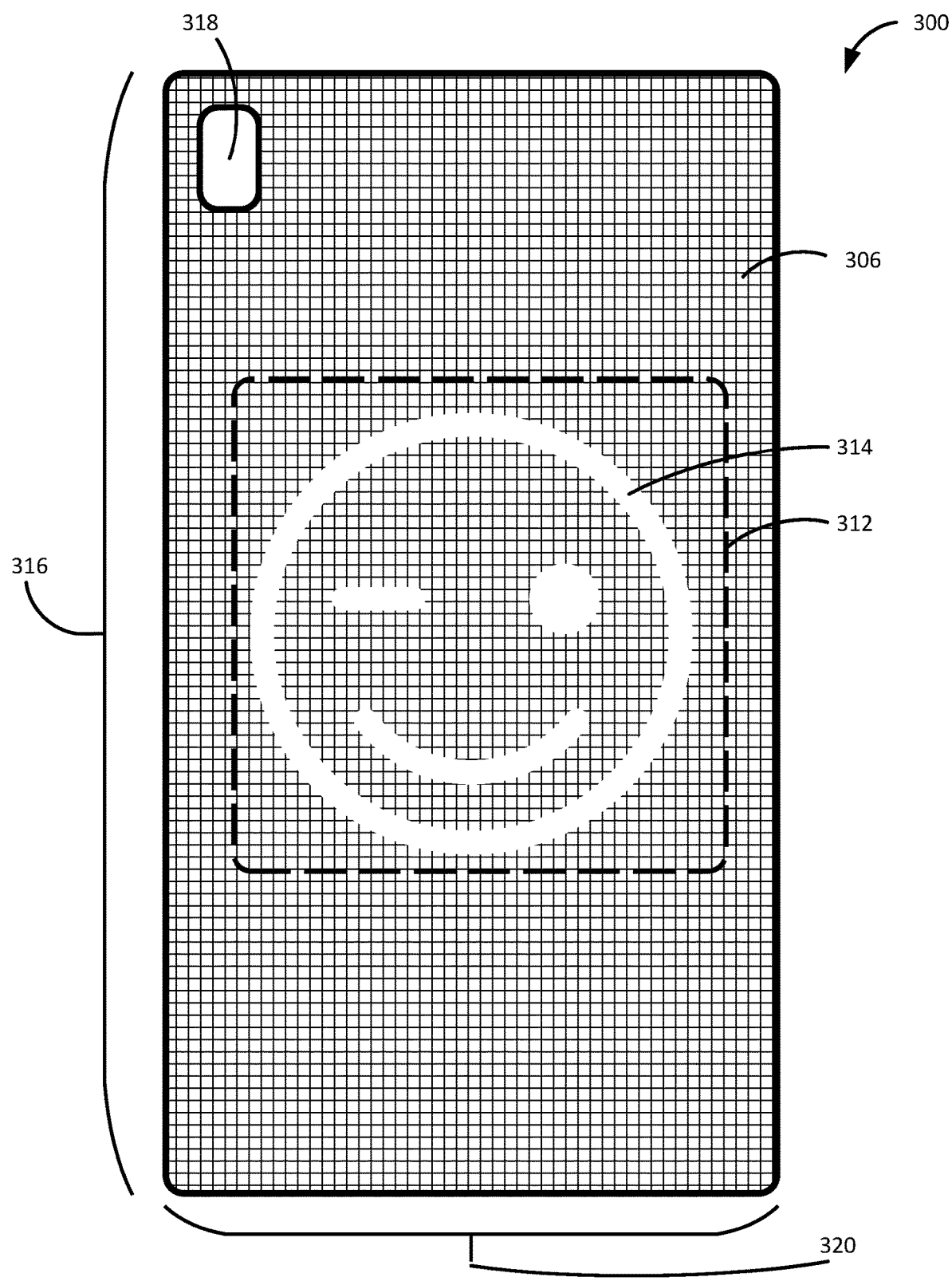
FIG. 3 shows a detailed top-down view of an interchangeable layer of the LED system with an example indicium associated therewith, light being able to shine through translucent elements of the example indicium in accordance with an embodiment.

Referring to FIG. 3, a detailed top-down view 300 of an intermediate layer 306 of the flashing LED system 100 with an example indicium 312 associated therewith, light being able to shine through translucent elements of the example indicium 312, is shown. The intermediate layer 306 may have a height 316, a width 320, and a camera visibility hole 318 to match a particular intended smartphone application. For better visualization of the intensity (e.g., loudness), beats and or rhythm of sounds (e.g., the ringtone for an incoming phone call) or music played by the smartphone, the intermediate layer 306, e.g., akin to intermediate layers 106 and 206 shown and discussed in FIGS. 1 and 2, respectively, may also include a cut-out of an indicium 312, also akin to the cut-outs 212. One skilled in the art will appreciate that the indicium 312 is provided as an example and that other suitable indicia may exist, e.g., to conform to the particular logo of a band, or mimic the night sky with stars and galaxies and the like.

Upon the systematic activation and deactivation of one or more LEDs associated with a circuit board of a flashing LED system, e.g., akin to the flashing LED system 100 shown and discussed with FIG. 1, emitted light from the LEDs shines through an open region 314 of the indicium 312. In an embodiment, the open region 314 may be filled with glass to complete the intermediate layer 306.

Referring to FIG. 4, a schematic illustration of a circuit board 400 (also referred to as an "example flashing panel unit" and/or an "electronic panel") is shown, the circuit board 400 having several LEDs 408 installed therein for illumination in accordance with sound detected from the portable electronic peripheral. As conventionally understood and as defined here, a "circuit board" or "printed circuit board" refers to a board that mechanically supports and electrically connects electronic components or electrical components using conductive tracks, pads and other features etched from one or more sheet layers of copper laminated onto and/or between sheet layers of a non-conductive substrate. Components are generally soldered onto the PCB to both electrically connect and mechanically fasten them to it. Also, as conventionally understood and as defined here, a light-emitting diode ("LED") is a semiconductor light source that emits light when current flows through it. Electrons in the semiconductor recombine with electron holes, releasing energy in the form of photons. This effect is called electroluminescence. [Source: "LED". Encyclopaedia Britannica; Retrieved on: 01-12-19]. The color of the light (corresponding to the energy of the photons) is determined by the energy required for electrons to cross the band gap of the semiconductor. [Source: Edwards, Kimberly D. "Light Emitting Diodes" (PDF). University of California at Irvine. p. 2; Retrieved on: 01-12-19]. White light is obtained by using multiple semiconductors or a layer of light-emitting phosphor on the semiconductor device. [Source: Lighting Research Center. "How is white light made with LEDs?". Rensselaer Polytechnic Institute; Retrieved on 01-12-19]. LEDs may be known to have many advantages over incandescent light sources, including generally lower energy consumption, longer lifetime, improved physical robustness, smaller size, and faster switching. Light-emitting diodes are used in applications as diverse as aviation lighting, automotive headlamps, advertising, general lighting, traffic signals, camera flashes, lighted wallpaper and medical devices. [Source: Pelez, E. A; Villegas, E. R (2007). LED power reduction trade-offs for ambulatory pulse oximetry. 2007 29th Annual International Conference of the IEEE Engineering in Medicine and Biology Society. 2007. pp. 2296-9.] Unlike a laser, the color of light emitted from an LED is neither coherent nor monochromatic, but the spectrum is narrow with respect to human vision, and functionally monochromatic. [Source: "LED Basics Department of Energy"; www.energy.gov: Retrieved on: 10-22-2018; "LED Spectral Distribution"; optiwave.com; Jul. 25, 2013; Retrieved on: 06-20-2017] Printed circuit boards are used in all but the simplest electronic products. They are also used in some electrical products, such as passive switch boxes.

Further, by selection of different semiconductor materials, single-color LEDs can be made that emit light in a narrow band of wavelengths from near-infrared through the visible spectrum and into the ultraviolet range. As the wavelengths become shorter, because of the larger band gap of these semiconductors, the operating voltage of the LED increases. Red, green, and blue ("RGB") LED systems allow for the mixing of red, green, and blue sources to produce white light needs electronic circuits to control the blending of the colors. Since LEDs have slightly different emission patterns, the color balance may change depending on the angle of view, even if the RGB sources are in a single package, so RGB diodes are seldom used to produce white lighting. Nonetheless, this method has many applications because of the flexibility of mixing different colors, [Source: Moreno, I.; Contreras, U. (2007). "Color distribution from multi-color LED arrays". Optics Express. 15 (6): 3607-3618] and in principle, this mechanism also has higher quantum efficiency in producing white light. [Source: Yeh, Dong-Ming; Huang, Chi-Feng; Lu, Chih-Feng; Yang, Chih-Chung; "Making white-light-emitting diodes without phosphors; SPIE Homepage: SPIE"; spie.org; Retrieved on: 04-17-19].

Accordingly, the LEDs 408 may include, for example (and without limitation thereto), a red LED, a green LED, and a blue LED that may intermittently or constantly shine independently or in any combination to produce a wide range and variety of colored illumination possibilities, e.g., through various combinations of the red LED shining red light, the green LED shining green light, and the blue LED shining blue light. Moreover, each of the red, green and blue LEDs may be oriented or configuration in any position on the circuit board 400, the general configuration of the LEDs 408 as positioned on a width-wise extension 416 of the circuit board 400 shown in FIG. 4 being provided for example purposes only. One skilled in the art will appreciate that other suitable positions or configurations of the LEDs 408 on the circuit board 400 may exist without departing from the scope and spirit of the disclosed embodiments.

Extending from a center section or portion of the width-wise extension 416 of the circuit board 400 is a length-wise connection portion 414, which may be positioned generally parallel to a smartphone when installed in, for example, flashing LED system 100 as shown in FIG. 1. In an embodiment, the length-wise connection portion 414 may include an acoustic sensor 406, which may also be referred to interchangeably as an "audio detection sensor" or "microphone." As generally understood and as defined herein, a "microphone" is a transducer that converts sound into an electrical signal. Microphones are used in many applications such as telephones, hearing aids, public address systems for concert halls and public events, motion picture production, live and recorded audio engineering, sound recording, two-way radios, megaphones, radio and television broadcasting, and in computers for recording voice, speech recognition, VoIP, and for non-acoustic purposes such as ultrasonic sensors or knock sensors. In an embodiment, the acoustic sensor 406 may be or otherwise include or have integrated therewith a "surface acoustic wave sensor", referring to a class of microelectromechanical systems ("MEMS") which rely on the modulation of surface acoustic waves to sense a physical phenomenon. The sensor transduces an input electrical signal into a mechanical wave which, unlike an electrical signal, can be easily influenced by physical phenomena. The device then transduces this wave back into an electrical signal. Changes in amplitude, phase, frequency, or time-delay between the input and output electrical signals can be used to measure the presence of the desired phenomenon. Regarding functionality, the structure of the basic surface acoustic wave sensor allows for the phenomena of pressure, strain, torque, temperature, and mass to be sensed. One skilled in the art will appreciate that the above-identified types of acoustic sensor 406 are provided as examples only, and that other suitable specific types or variants of the acoustic sensor may exist.

The circuit board 400 may have a defined width 404 and length 402. At an end of the length 402 of the circuit board 400 may be a plug 410 (e.g., that may also be referred to as a "connection plug") capable of insertion into a corresponding data or charge port of the smartphone. The plug 410 may be or otherwise correspond with a micro universal serial bus ("USB"), USB Type C, and/or Apple® Lightning port, or any other suitable port to provide power to the circuit board 400.

In an embodiment, one or more integrated circuits 412 may be distributed equidistant from one-another interspersed between the LEDs 408. The integrated circuits 412, as commonly understood and as defined herein, refer to a set of electronic circuits on one small flat piece (or "chip") of semiconductor material that is normally silicon. The integration of large numbers of tiny transistors into a small chip results in circuits that are orders of magnitude smaller, faster, and less expensive than those constructed of discrete electronic components. The IC's mass production capability, reliability, and building-block approach to circuit design has ensured the rapid adoption of standardized ICs in place of designs using discrete transistors. ICs are now used in virtually all electronic equipment and have revolutionized the world of electronics. The integrated circuits 412 may be referred to herein in the alternative as an "IC", a "chip," a "computer chip", and/or a "microchip". One skilled in the art will appreciate that other suitable forms of nomenclature for the integrated circuits 412 may exist without departing from the scope and spirit of the disclosed embodiments.

The acoustic sensor 406 detects vibrations produced by, for example (but without limitation thereto), sound emitted by the smartphone when installed or otherwise inserted in, for example, the flashing LED system 100 as shown in FIG. 1. Such a detection of the presence of sound includes a complete recognition of any and/or all physical properties of the sound, inclusive of (but not limited to): intensity (e.g., volume), variance in intensity per elapsed unit time, beat, rhythm, bass, treble, mid-tones, equalization pre-set settings, and/or any other characteristic associated with ringtones representative of incoming calls, music or any other type of acoustic and/or vibrational energy. In an embodiment, the acoustic sensor 406 may be configured to also detect sounds and/or vibrations as described above emanated by sources other than a smartphone, e.g., that may be prevalent in a surrounding environment. Such settings may be input by a user through a smartphone app installed therein allowing for toggling between detection capabilities, e.g., as emitted by the smartphone itself or as prevalent in a surrounding atmosphere or environment. Further, sensitivity levels and/or thresholds may also be input via such an app such that the acoustic sensor 406 detects sounds, vibrations, noises and/or the like above a certain pre-specified loudness or intensity level, e.g., measured in decibels. One skilled in the art will appreciate that the listing of physical properties and functional capabilities of the app responsible for controlling operational capability of the acoustic sensor 406 is non-exhaustive and provided as an example only, as is the representative sensitivities of the acoustic sensor 406 itself, e.g., to sounds, noises, vibrations, etc.

Operationally, insertion of the plug 410 into a corresponding port of the smartphone allows for powering of the circuit board 400 and the by the smartphone and the activation of the acoustic sensor 406. Any type of triggering circumstance or scenario, e.g., an incoming call resulting in the audible ringing mated with corresponding vibration of the smartphone, music played by the smartphone, music prevalent in an ambient exterior atmosphere or environment to or of the smartphone, and/or any combination thereof or other suitable triggering condition, is detected by the acoustic sensor 406 that electronically communicates with the one or more of the integrated circuits 412, which control the systematic activation and/or deactivation of one or more of the LEDs 408 to produce a multitude of a colors, patterns, flashings and/or combinations thereof that, in an embodiment, at least substantially mimic or otherwise resemble the sounds, vibrations, etc. that constitute the triggering circumstances or conditions for the acoustic sensor 406. In an embodiment, the integrated circuits 412 essentially act as an electronic controller responsible for controlling the intensity, size and position of light emitted by one or more of the LEDs 408 allowing for the production of a vast array of flickering, activations, colors, hues, vibrancy levels, and other visual traits or distinctions. Moreover, in an embodiment, the integrated circuits 412 may be programmed by, for example (but without limitation thereto), an app of the smartphone to flash a certain pre-specified color or at a certain pre-specified frequency when the acoustic sensor 406 detects a triggering condition, e.g., a sound and/or vibration. Such capabilities of the circuit board 400 provide for a complete visualization solution for triggering conditions, e.g., sounds, vibrations, music, emitted by the smartphone or prevalent in an ambient environment, effectuated by the systematic activation and deactivation of the LEDs 408 as instructed by the integrated circuits 412.

Figure 5:
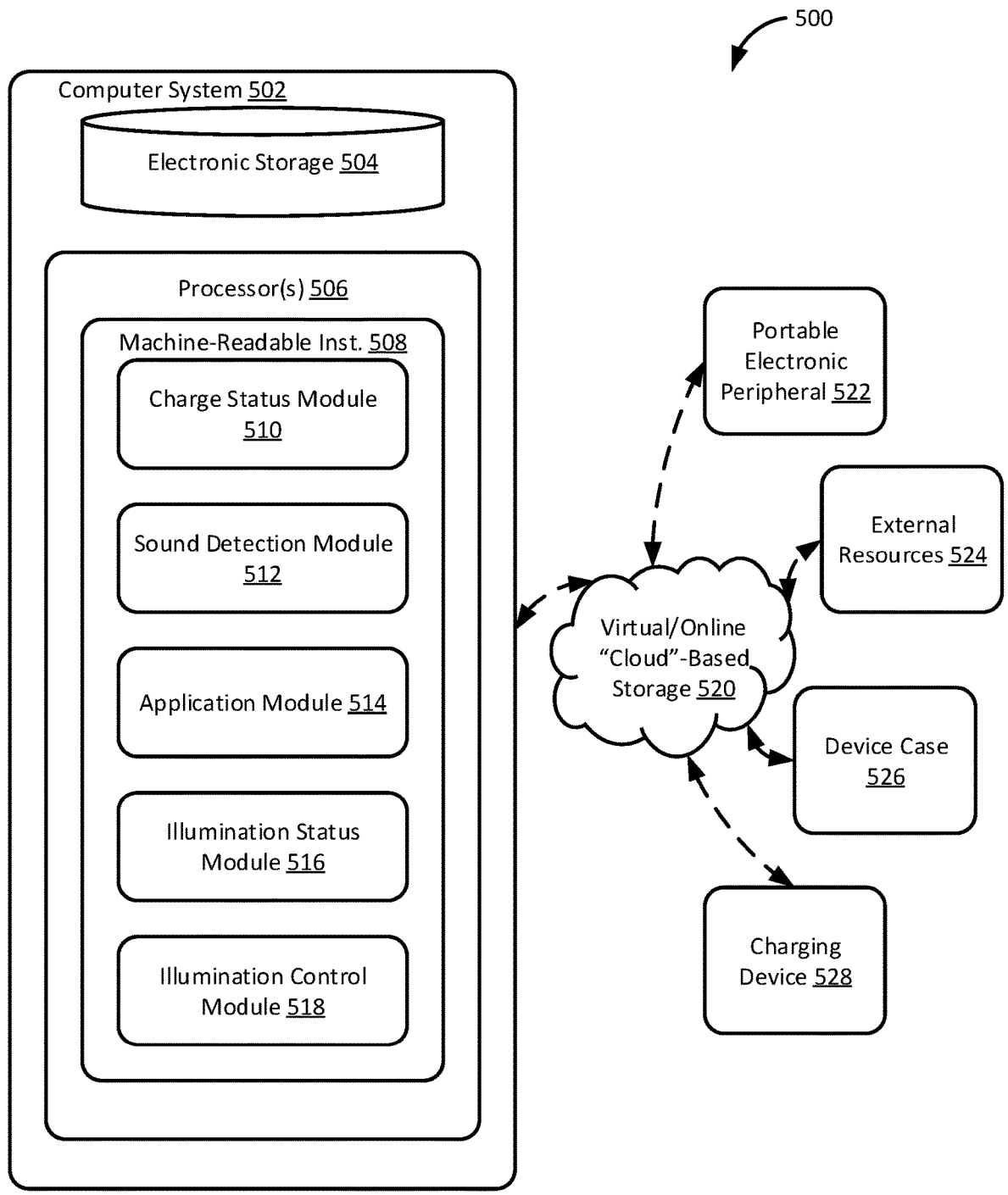
FIG. 5 illustrates an example computer-based wireless network and/or system for providing for the illumination of a cover for a portable electronic device based on sound emanated therefrom in accordance with an embodiment.

Referring to FIG. 5, an example computer-based wireless network and/or system 500 for providing for the illumination of a cover for a portable electronic device based on sound emanated therefrom is shown. A computer system 502, e.g., as integrated into or otherwise associated with a smart phone or device, e.g., such as hardware responsible for running an operating system such as Apple® iOS or android, includes electronic communication capabilities with an electronic storage 504 and one or more processors 506. In an embodiment, the processors 506 receive, output and/or otherwise consider or are responsive to machine-readable instructions, e.g., non-transitory computer-readable instructions, 508 (e.g., stored via computer code) inclusive of (but not limited to) the following modules: a charge status module 510, a sound detection module 512, an application module 514, an illumination status module 516, and an illumination control module 518. The computer system 502, both as a whole and/or from individual components and/or modules thereof, may electronically and/or wirelessly communicate with a virtual/online "cloud"-based storage 520, which may, in turn, maintain regular and/or intermittent wireless or wired electronic communication with any one or more of: a portable electronic peripheral 522, external resources 524, a device case 526, and/or a charging device 528.

The system 500 for provides for the LED-based illumination of the portable electronic peripheral 522, such as a smartphone, based on peripheral-related information and/or the detection of audio-related conditions associated therewith, e.g., either generated by the portable electronic peripheral 522 and/or as detected thereby of ambient surroundings in accordance with an embodiment. System 500 may be configured to trigger illumination to be provided at the device case 526, the portable electronic peripheral 522 itself, the charging device 528, or other objects. In example, the system 500 may cause LED-based or sourced illumination (e.g., flickering, flashing, glowing, lighting-up, and/or other illumination) to be provided at the device case 526, by, for example (but without limitation thereto), the circuit board 400 as shown in FIG. 4 Illumination may be generated by one or more LEDs based on an illumination status as detected and/or otherwise communicated by the illumination status module 516. The illumination status module 516 may describe the manner in which the illumination is to be provided by, for example, LEDs. For example, the illumination status module 516 may indicate an amount (e.g., brightness), a color, a pattern, a time feature, a location, and/or other characteristics of the illumination. An illumination status may be determined based by the illumination status module 516 on various factors, for example, a charge status of portable electronic peripheral 522, wireless data communication and/or information (e.g., incoming, received, and/or missed calls, text messages, email, Voicemail, etc.), application information (e.g., a command from an application, a characteristic of an activity of an application, a type of application, etc.), and/or other factors.

In an embodiment, the computer system 502 may be configured to execute the machine-readable instructions 508, which may include: the charge status module 510, the sound detection module 512, the application module 514, the illumination status module 516, the illumination control module 518, and/or other modules.

The charge status module 510 may be configured to obtain a charge status of the portable electronic peripheral 522, which may be or otherwise include a mobile device, a smartphone, and/or other electronic devices. A charge status may indicate whether the portable electronic peripheral 522 is being electrically charged via charging device 528. In an embodiment, the charge status may indicate a battery level of portable electronic peripheral 522. A battery level may describe a charge percentage, an amount of time and/or battery remaining, and/or other battery level information.

In an embodiment, illumination may be provided at the device case 526 and/or on an illumination status that is at least partially based on sounds, vibrations, or other acoustical energy detection by the sound detection module as emitted by the portable electronic peripheral 522 or the external resources 524, application related data, and/or other data. The application module 514 may be configured to obtain wireless data communication and/or information, which may be related to an incoming wireless data communication item, a received wireless data communication item, a missed wireless data communication item, and/or other wireless data communication item, e.g., text message, email, voicemail, incoming phone call, music played on the smartphone, music detected as being played in an environment in a vicinity of the smartphone, etc. For example, the receipt of a text message may cause device case 526 to illuminate a red LED briefly (e.g., a red flash of light). One skilled in the art will appreciate that the provided scenario of an incoming text message triggering the illumination of a red LED on, for example (and without limitation thereto), the device case 526 is provided as an example and that other triggering circumstances may result in the corresponding illumination of other colored LEDs in any combination, allowing for the sound detection module 512 to detect sounds and/or vibration to communicate such detection to the application module for the commensurate illumination of one of more LEDs. Further, the illumination status module 516 may monitor the illumination states of one or more LEDs of, for example (and without limitation thereto) of the device case 526 to electronically communicate with the illumination control module 518 which may, in turn, systematically activate and deactivate LEDs of the device case 526 to supplement or redirect such activation of the LEDs as triggered by the sound detection module 512.

Referring to FIG. 6, a flow chart for an example process flow 600 for operation of the LED system of any one or more of that shown FIGS. 1-5. The flow chart includes a start operation 602 followed by a monitoring operation 604, a detecting operation 606, a selectively activating and deactivating operation 608 and an optional activating operation 616 according to the detection operation prior to an end 612. The process flow 600 may further include a return operation 614 and a bypass operation 616 in one or more embodiments.

After initiation of the process flow 600 at the start operation 602, the monitoring operation 604 includes, in an embodiment, monitoring, by a computer-based system that includes one or more physical processors executing machine-readable instructions stored on non-transitory memory of the computer-based system, audio being output from a portable electronic device. Such audio may be, for example (but without limitation thereto), emitted, emanated, played, or otherwise output from a smartphone associated with the process flow 600, or from another source within a vicinity of such a smartphone. Next, the process flow 600 may involve the detection, by the computer-based system, an intensity and/or a rhythm of the audio output from the portable electronic device at the monitoring operation 604. The detection performed at the detection operation 606, in an embodiment, at least partially controls the selective activation and deactivation at operation 608, by the computer-based system, a plurality of light emitting diodes (LEDs) affixed onto a removable protective case for the portable electronic device based on the detection at least in part of one or more of the intensity and/or the rhythm of the audio to visualize the audio.

In an embodiment, the process flow 600 may transition directly to the end 612 for culmination thereof. Alternatively, in an embodiment, the process 600 may return via the return operation 614 to the monitoring operation 604 for continued illumination of the LEDs commensurate with the detection of the intensity and/or rhythm of the audio detected at the detection operation 606. Still further, and in the alternative, the process flow 600, in an embodiment, may transition to an activation operation 610 for the activation of the plurality of LEDs to generate a luminescence according to the intensity and/or the rhythm of the audio such that faster-paced and/or louder audio results in a proportionate corresponding increased activation of the LEDs and slower-paced and/or softer audio results in a proportionate corresponding decreased activation of the LEDs prior to the end 612. One skilled in the art will appreciate that the operations 602-612, the bypass operation 616, and the return operation 614 are shown in an example order or configuration and that other suitable orders or configurations of any one or more of the operations 602-612, 616 and 614 may exist without departing from the scope and spirit of the disclosed embodiments.

Functionality

The flashing LED system 100 shown in FIG. 1, as well as the various systems and/or process flows 200-600 shown in FIGS. 2-6, respectively, provides a comprehensive solution for the proportionate activation and deactivation of LEDs commensurate with detected sound. In an embodiment, that detected sound may be emitted by a smartphone associated with the system 100, or by another source in the vicinity of the smartphone and/or the system. Accordingly, disclosed systems and methods provide for entertainment of a user allowing for the visualization of sounds, e.g., music, and further customization via, for example (but without limitation thereto), an app installed in the smartphone responsible for setting individual threshold and performance levels, e.g., associating the lighting of a particular colored LED in response to a detected intonation or volume level, etc.

Moreover, systems and methods of use thereof of the disclosed embodiments provide for the convenient and repeatable removal and reinstallation of one or more layers, e.g., individually and/or collectively, allowing for the further customization of indicia associated with such layers, e.g., cut-out therefrom, allowing for users to match coverings to music being played, or their mood, etc. one skilled in the art will appreciate that other configurations and/or placements of the components associated with the systems of the disclosed embodiments may exist without departing from the scope and spirit thereof.

Advantages

Advantages include variability in selection and reinstallation of one or more transparent or translucent layers of a cover assembly prior to or during illumination responsible for visualization of music played by a smartphone. Such layers provide complete flexibility in matching indicia with, for example (but without limitation thereto), to music being played by the smartphone or as detected thereof as being played within a nearby vicinity.

All references, including granted patents and patent application publications, referred herein are incorporated herein by reference in their entirety. While the light-emitting diode ("LED") system and method for illuminating a cover for a portable electronic device has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A cover system for covering a portable electronic device with a computer processor integrated therein, the cover system comprising:
    a protective cover that at least partially covers the portable electronic device when the portable electronic device is inserted in the protective cover, the protective cover comprising:
        an assembly energized by an electrical signal, the assembly being removably coupled with the protective cover; and
        an electronic panel fixedly coupled with the assembly and the protective cover, the electronic panel having:
            a microphone that detects a sound and/or a vibration emitted by the portable electronic device;
            a plurality of light-emitting-diodes (LEDs) embedded in the electronic panel;
            a plug powering the plurality of LEDs, the plug electrically connecting to a port of the portable electronic device to power the LEDS thereby; and
            an integrated circuit that generates an electrical signal to activate the plurality of LEDs in response to detection of sound by the microphone to cause the LEDs to produce a luminescence proportionate to and commensurate with an intensity and/or a rhythm of the sound and/or the vibration, wherein the LEDs produce patterns through multiple layers of an interchangeable substrate to supplement and/or correspond to music being played.

2. The cover system of claim 1, wherein the assembly has multiple layers including:
    a glass layer;
    an intermediate layer having a pattern cut out therefrom; and
    a luminous layer that luminesces in response to being energized by the electrical signal, wherein luminescence being emitted through the pattern cut out from the intermediate layer and through the glass layer to be visible.

3. The cover system of claim 2, wherein the glass layer, the intermediate layer, and the luminous layer assemble together to form the interchangeable substrate.

4. The cover system of claim 3, further comprising:
    an adhesive layer that affixes onto the electronic panel, the adhesive layer removably adhering to to the interchangeable substrate.

5. The cover system of claim 1, wherein the sound and/or vibration is associated with any one or more group consisting of:
    a ringtone indicative of an incoming call to the portable electronic device and music or sounds played by the portable electronic device.

6. The cover system of claim 1, wherein the integrated circuit generates the electrical signal to activate the plurality of LEDs to generate the luminescence according to the intensity and/or rhythm of the sound and/or the vibration detected by the microphone as being emitted by the portable electronic device such that faster-paced an/or louder music and/or sounds played by the portable electronic device results in a proportionate corresponding increased activation of the plurality of LEDs and slower-paced and/or softer music and/or sounds played by the portable electronic device results in a proportionate corresponding decreased activation of the plurality of LEDs.

7. The cover system of claim 1, further comprising:
    a set of non-transitory computer-readable instructions which, when executed by the computer processor of the portable electronic device, direct the computer processor to establish a wireless communication session with the integrated circuit to transmit wireless data communication thereto, the wireless data communication including information relating the intensity and/or the rhythm of the sound and/or the vibration detected by the microphone.

8. The cover system of claim 2, wherein the pattern cut out from the intermediate layer corresponds to an indicium selected by a user of the cover system.

9. The cover system of claim 1, wherein the plurality of LEDs include a red LED, a green LED, and a blue LED, such that, upon activation of the plurality of LEDs, the red LED, the green LED, and the blue LED emit light.

10. The cover system of claim 9, wherein, upon an activation of the plurality of LEDs, the red LED, the green LED, and the blue LED emit light for combination in various proportions to obtain any color in a visible spectrum.

11. The cover system of claim 10, wherein levels of red light, green light, and blue light each range from 0 to 100 percent of intensity.

12. The cover system of claim 1, wherein the plug is selected from a group consisting of:
   micro-universal serial bus (USB), USB type C, and Apple® Lightning ports.

13. The cover system of claim 3, wherein the interchangeable substrate is exchanged with one or more additional interchangeable substrates, each additional interchangeable substrate having a pattern cut out from its respective intermediate layer.

14. The cover system of claim 2, wherein the intermediate later is imprinted with ultraviolet-sensitive ink.

15. An electronic panel for generating illumination responsive to detection of a sound emitted by a portable electronic device, the electronic panel comprising:
   a microphone sensitive to the sound emitted by the portable electronic device, the microphone being in electronic communication with an integrated circuit in the electronic panel such that the integrated circuit generates an electric signal representative of an intensity and/or a rhythm of the sound upon detection thereof by the microphone;
   a plurality of light-emitting-diodes (LEDs) embedded in the electronic panel, the plurality of LEDs illuminating in response to the electric signal generated by the integrated circuit; and
   a plug powering the LEDs, the plug electrically connecting to a port of the portable electronic device to power the electronic panel thereby, wherein the LEDs produce patterns through multiple layers of an interchangeable substrate to supplement and/or correspond to music being played.

16. The electronic panel of claim 15, wherein the electronic panel removably interfaces with a protective cover for the portable electronic device.

17. The electronic panel of claim 15, wherein the portable electronic device is an Android®-based or Apple® phone.

18. The electronic panel of claim 15, wherein the integrated circuit electronically communicates with an operating system of the portable electronic device to control the illumination of the LEDs.

19. A method for generating illumination by LEDs responsive to detection of sound, the method being implemented by a computer-based system that includes one or more physical processors executing machine-readable instructions stored on non-transitory memory of the computer-based system which, when executed, perform the method, the method comprising the steps of:
   monitoring, by the computer-based system, audio being output from a portable electronic device;
   detecting, by the computer-based system, an intensity and/or rhythm of the audio; and
   activating and deactivating, by the computer-based system, a plurality of light emitting diodes (LEDs) affixed onto a removable protective case for the portable electronic device based on the detection at least in part on one or more of the intensity and/or rhythm of the audio to visualize the audio, wherein the LEDS produce patterns through multiple layers of an interchangeable substrate to supplement and/or correspond to music being played.

20. The method of claim 19, further comprising:
   activating the plurality of LEDs to generate a luminescence according to the intensity and/or the rhythm of the audio such that faster-paced and/or louder audio results in a proportionate corresponding increased activation of the LEDs and slower-paced and/or softer audio results in a proportionate corresponding decreased activation of the LEDs.

* * * * *